United States Patent
Park et al.

(10) Patent No.: US 9,852,331 B2
(45) Date of Patent: Dec. 26, 2017

(54) METHOD FOR PROVIDING MOTION RECOGNITION SERVICE AND ELECTRONIC DEVICE THEREOF

(71) Applicant: Samsung Electronics Co., Ltd., Gyeonggi-do (KR)

(72) Inventors: Chan Soo Park, Seoul (KR); Seungbeom Ryu, Gyeonggi-do (KR); Wonnhee Lee, Seoul (KR); Hyunsu Hong, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/060,937

(22) Filed: Mar. 4, 2016

(65) Prior Publication Data
US 2016/0275336 A1     Sep. 22, 2016

(30) Foreign Application Priority Data
Mar. 16, 2015   (KR) ..................... 10-2015-0036205

(51) Int. Cl.
*G06K 9/00*   (2006.01)

(52) U.S. Cl.
CPC ...... *G06K 9/00335* (2013.01); *A63B 2220/00* (2013.01)

(58) Field of Classification Search
USPC ............. 382/103, 107, 207, 291; 340/573.1; 342/450; 345/158, 100; 482/1; 264/40.5; 315/505, 507; 324/559; 455/403, 456.1; 700/159; 702/183
See application file for complete search history.

(56) References Cited

U.S. PATENT DOCUMENTS

| | | | | |
|---|---|---|---|---|
| 7,904,097 B2* | 3/2011 | Misikangas | ........... | H04W 64/00 455/403 |
| 8,131,465 B2* | 3/2012 | Eitan | ....................... | G01S 19/34 340/573.1 |
| 8,187,182 B2* | 5/2012 | Kahn | .................. | A61B 5/1038 482/1 |
| 8,777,104 B1* | 7/2014 | Brock | .................. | G06K 7/0095 235/379 |
| 8,880,373 B2 | 11/2014 | Kulik et al. | | |

(Continued)

FOREIGN PATENT DOCUMENTS

| | | |
|---|---|---|
| JP | 2013-41323 A | 2/2013 |
| KR | 10-2009-0057863 A | 6/2009 |

OTHER PUBLICATIONS

Tao Yang et al., Feedback Particle Filter, pp. 1-32, Feb. 26, 2013.

*Primary Examiner* — Anh H Do
(74) *Attorney, Agent, or Firm* — Cha & Reiter, LLC

(57) ABSTRACT

The apparatus includes: a sensor module configured to detect sensor data corresponding to the motion of the apparatus, at least one processor that is electrically coupled with the sensor module and a non-transitory memory storing instructions executable by the processor to execute the method, including detecting the one or more pieces of sensor data by using the sensor module, detecting whether a motion pattern corresponding to the sensor data is stored in the memory, and generating a motion pattern based on at least some of the sensor data according to whether the motion pattern is stored in the memory.

16 Claims, 33 Drawing Sheets

(56) References Cited

U.S. PATENT DOCUMENTS

| | | | |
|---|---|---|---|
| 8,952,895 B2 * | 2/2015 | Moore | G06F 3/01 |
| | | | 345/158 |
| 8,967,471 B1 * | 3/2015 | Rosenthal | G06K 7/0095 |
| | | | 235/379 |
| 9,110,510 B2 * | 8/2015 | Moore | G06F 3/017 |
| 9,185,062 B1 * | 11/2015 | Yang | H04L 51/046 |
| 9,207,835 B1 * | 12/2015 | Yang | H04L 51/046 |
| 9,509,828 B2 * | 11/2016 | Lee | H04M 1/7253 |
| 2010/0275166 A1 | 10/2010 | Jeon et al. | |
| 2013/0132454 A1 | 5/2013 | Mehta et al. | |
| 2017/0102787 A1 * | 4/2017 | Gu | G06F 3/0346 |

\* cited by examiner

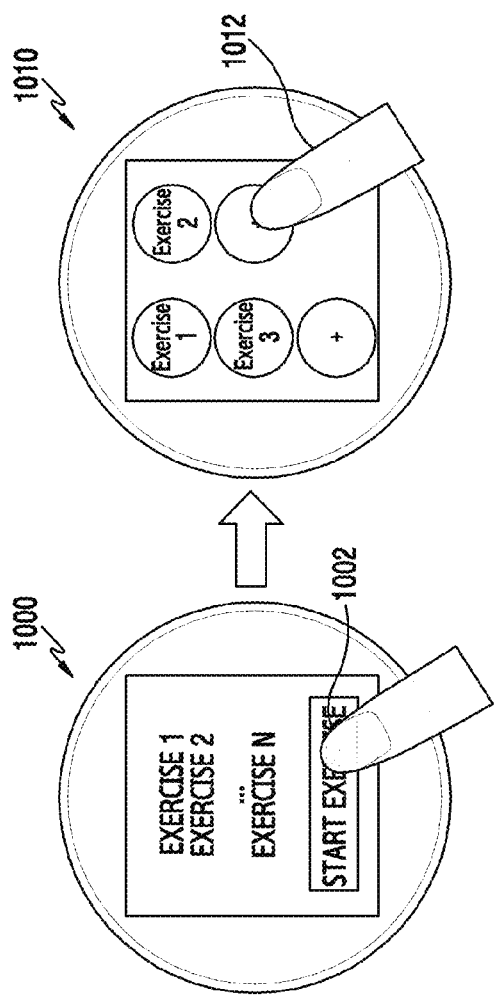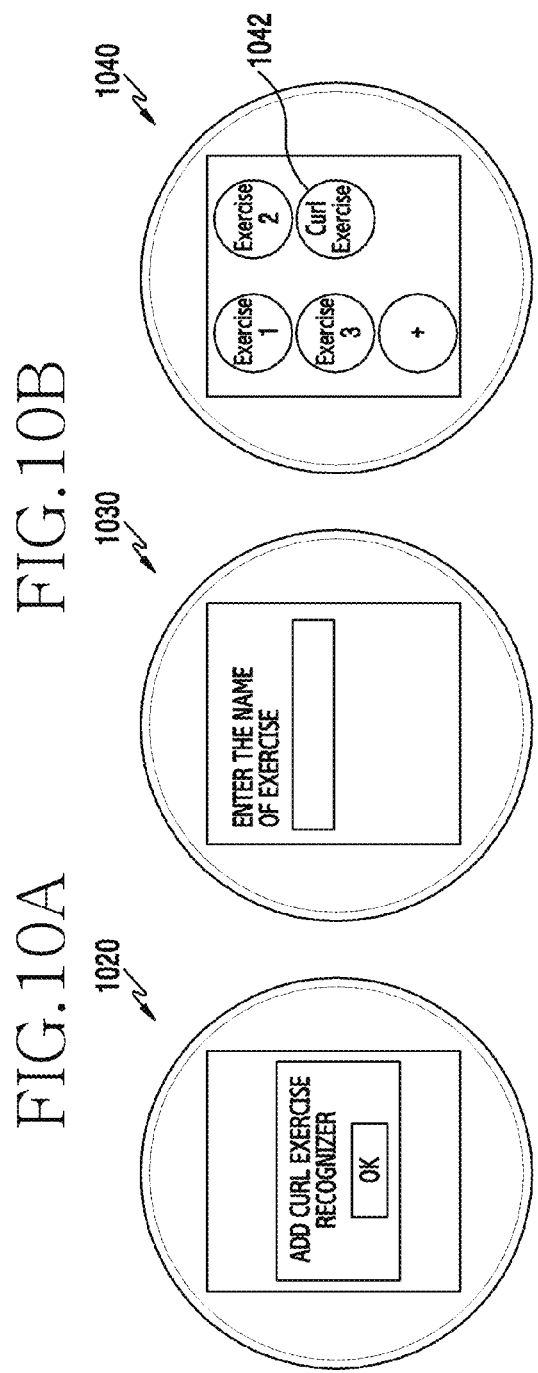

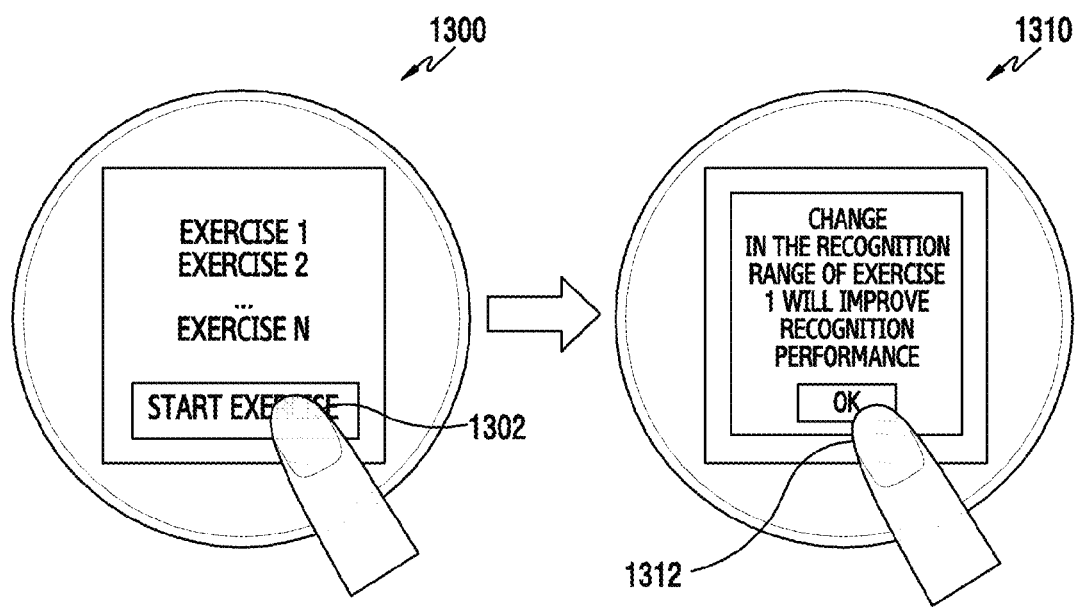
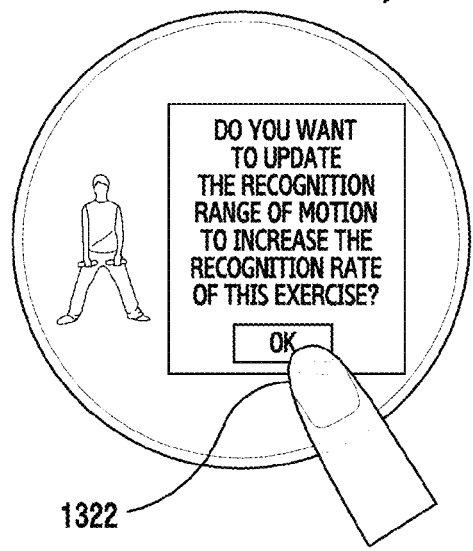
FIG.13A FIG.13B FIG.13C

METHOD FOR PROVIDING MOTION RECOGNITION SERVICE AND ELECTRONIC DEVICE THEREOF

CLAIM OF PRIORITY

This application claims the priority under 35 U.S.C. §119(a) to Korean Application Serial No. 10-2015-0036205, which was filed in the Korean Intellectual Property Office on Mar. 16, 2015, the entire content of which is hereby incorporated by reference.

BACKGROUND

Field of the Disclosure

Various embodiments of the present disclosure relate to an apparatus and a method for providing a motion recognition service in the electronic device.

Description of the Related Art

Electronic devices may detect movement of a user who uses the electronic devices by using a variety of sensors (e.g., an accelerometer, a gyro sensor, a geomagnetic sensor, or the like) to collect motion data. The electronic device may provide a motion recognition service by using the motion data detected through the sensors. For example, the electronic device may detect a preset motion pattern corresponding to the user's motion data that is detected through the sensors in order to thereby recognize a current operation (motion) of the user.

The electronic device may store a plurality of motion patterns that are defined in order to recognize an operation corresponding to the user's motion data. However, since a number of users who use the electronic devices have different body structures from each other, it is impossible to detect the same motion data for the same motion. Accordingly, the electronic device may have a low recognition rate for the user's motion according to standardized motion patterns.

SUMMARY

Various embodiments of the present disclosure may provide an apparatus and a method for creating or updating a motion pattern based on the motion data that is detected through one or more sensors in the electronic device.

Various embodiments of the present disclosure provide an apparatus and a method for generating exercise guide information based on the motion data that is detected through one or more sensors in the electronic device.

Various embodiments of the present disclosure are directed to an apparatus and a method for providing exercise execution information corresponding to a motion pattern in the electronic device.

According to various embodiments of the present disclosure, an electronic device may include: a sensor module that senses (detects) one or more pieces of sensor data corresponding to the motion of the electronic device; at least one processor that is electrically connected with the sensor module; and a memory that is electrically connected with the processor, and stores instructions that, when being executed, allow the processor to detect the one or more pieces of sensor data by using the sensor module, to identify whether or not there is a motion pattern corresponding to the one or more pieces of sensor data in the memory, and to create a motion pattern based on at least some of the one or more pieces of sensor data according to whether or not there is a motion pattern corresponding to the one or more pieces of sensor data.

According to various embodiments of the present disclosure, an electronic device may include: a sensor module that is configured to detect one or more pieces of sensor data corresponding to the motion of the electronic device; at least one processor that is electrically connected with the sensor module; and a memory that is electrically connected with the processor, and stores instructions that, when being executed, allow the processor to detect the one or more pieces of sensor data by using the sensor module, to detect a motion pattern corresponding to the one or more pieces of sensor data, and to update the motion pattern based on at least some of the one or more pieces of sensor data.

According to various embodiments of the present disclosure, an electronic device may include: a sensor module that is configured to detect one or more pieces of sensor data corresponding to the motion of the electronic device; at least one processor that is electrically connected with the sensor module; and a memory that is electrically connected with the at least one processor, and stores instructions that, when being executed, allow the at least one processor to detect one or more pieces of sensor data by using the sensor module, to detect a motion pattern corresponding to the one or more pieces of sensor data, to compare the one or more pieces of sensor data with the motion pattern, and to provide information for changing the motion based on at least some of the comparison result.

BRIEF DESCRIPTION OF THE DRAWINGS

The above and other aspects, features, and advantages of the present disclosure will be better appreciated by a person of ordinary skill in the art from the following detailed description taken in conjunction with the accompanying drawings, in which:

FIG. 10A, FIG. 10B, FIG. 10C, FIG. 10D and FIG. 10E show screen configurations for creating a motion pattern, according to various embodiments of the present disclosure;

FIG. 13A, FIG. 13B and FIG. 13C show screen configurations for updating a motion pattern, according to various embodiments of the present disclosure;

DETAILED DESCRIPTION

Figure 1:
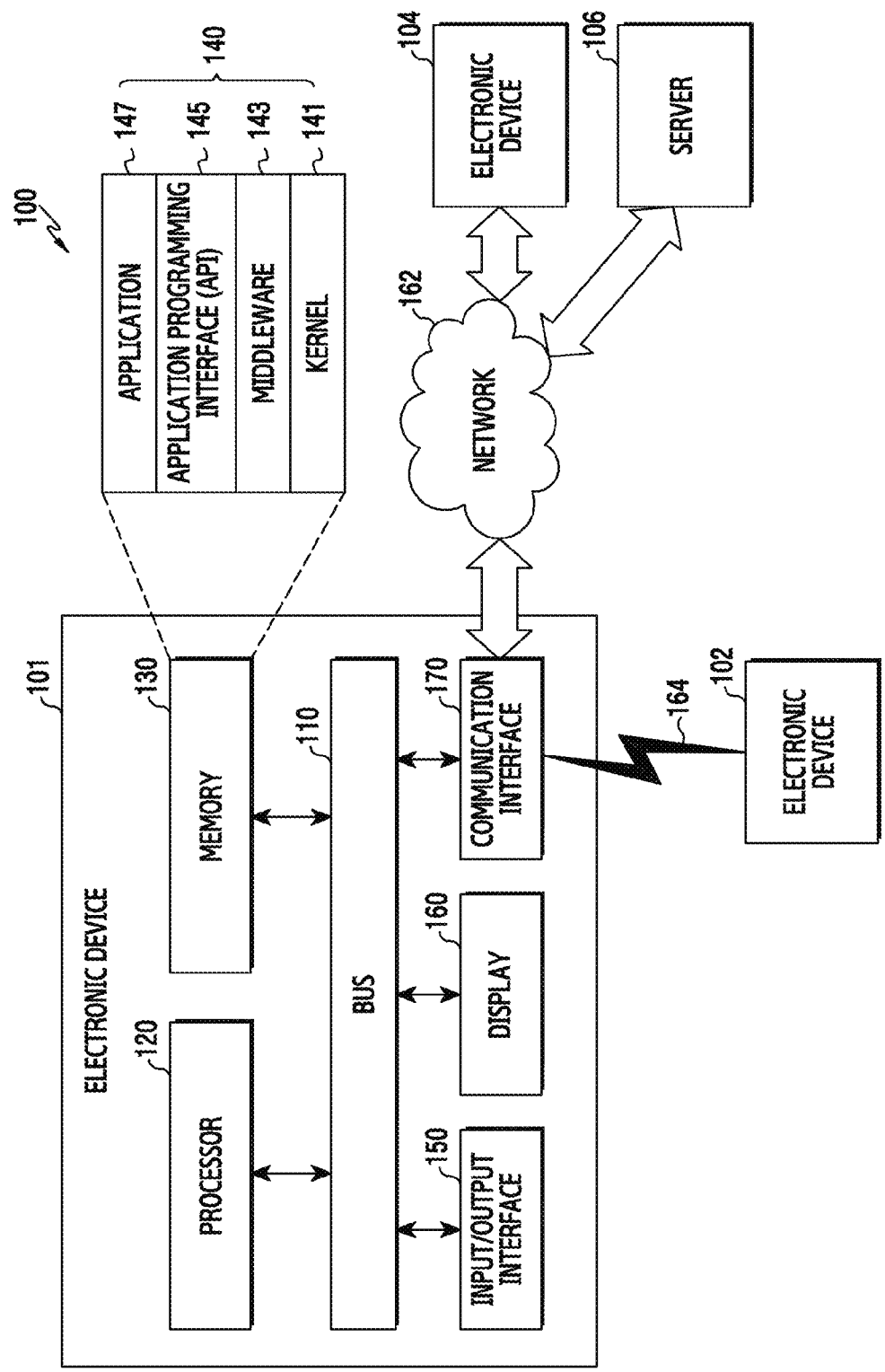
FIG. 1 illustrates an electronic device in a network environment, according to various embodiments of the present disclosure.

Hereinafter, various embodiments of the present disclosure will be described with reference to the accompanying drawings. In the following description, specific details such as detailed configuration and components are provided to assist a person of ordinary skill in the art the overall understanding of these embodiments of the present disclosure. Therefore, it should be apparent to those skilled in the art that various changes and modifications of the embodiments described herein can be made without departing from the spirit of the present disclosure and scope of the appended claims. In addition, descriptions of well-known functions and constructions may be omitted for clarity and conciseness when their inclusion may obscure appreciation of the disclosure by a person of ordinary skill.

The present disclosure has various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications/changes, equivalents, and/or alternatives falling within the spirit and the scope of the present disclosure. In describing the drawings, similar reference numerals may be used to designate similar elements.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., a first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may mean that the apparatus is may perform such operations along with other devices or parts in a certain situation. For example, "a processor configured to (set to) perform A, B, and C" may be at least one dedicated processor, e.g., an embedded processor, for performing a corresponding operation, or a generic-purpose processor, e.g., a Central Processing Unit (CPU) or an application processor (AP), which can perform a corresponding operation by executing one or more software programs stored in a memory device.

The terms as used herein are used merely to describe certain embodiments and do not limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure. In addition, unless expressly stated otherwise, features from one embodiment can be included in the practice of other embodiments, and Applicant submits compliance with the written description requirement even though every possible combination of features from different embodiments is not expressly discussed, for reasons of clarity and conciseness.

An electronic device according to various embodiments of the present disclosure may be a device. For example, the electronic device according to various embodiments of the present disclosure may include at least one of: a smart phone; a tablet personal computer (PC); a mobile phone; a video phone; an e-book reader; a desktop PC; a laptop PC; a netbook computer; a workstation, a server, a personal digital assistant (PDA); a portable multimedia player (PMP); an MP3 player; a mobile medical device; a camera; a power bank; or a wearable device (e.g., a head-mount-device (HMD), an electronic glasses, an electronic clothing, an electronic bracelet, an electronic necklace, an electronic appcessory, an electronic tattoo, a smart mirror, or a smart watch).

In other embodiments, an electronic device may be a home appliance. For example, of such appliances may include at least one of: a television (TV); a digital video disk (DVD) player; an audio component; a refrigerator; an air conditioner; a vacuum cleaner; an oven; a microwave oven; a washing machine; an air cleaner; a set-top box; a home automation control panel; a security control panel; a TV box (e.g., Samsung HomeSync®, Apple TV®, or Google TV); a game console (e.g., Xbox® PlayStation®); an electronic dictionary; an electronic key; a camcorder; or an electronic frame.

In other embodiments, an electronic device may include at least one of: a medical equipment (e.g., a mobile medical device (e.g., a blood glucose monitoring device, a heart rate monitor, a blood pressure monitoring device or a temperature meter), a magnetic resonance angiography (MRA) machine, a magnetic resonance imaging (MRI) machine, a computed tomography (CT) scanner, or an ultrasound machine); a navigation device; a global navigation satellite system (GNSS); an event data recorder (EDR); a flight data recorder (FDR); an in-vehicle infotainment device; an electronic equipment for a ship (e.g., ship navigation equipment and/or a gyrocompass); an avionics equipment; a security equipment; a head unit for vehicle; an industrial or home robot; an automatic teller's machine (ATM) of a financial institution, point of sale (POS) device at a retail store, or an internet of things device (e.g., a Lightbulb, various sensors, an electronic meter, a gas meter, a sprinkler, a fire alarm, a thermostat, a streetlamp, a toaster, a sporting equipment, a hot-water tank, a heater, or a boiler and the like)

In certain embodiments, an electronic device may include at least one of: a piece of furniture or a building/structure; an electronic board; an electronic signature receiving device; a projector; and various measuring instruments (e.g., a water meter, an electricity meter, a gas meter, or a wave meter). Further, it will be apparent to those skilled in the art that an electronic device according to various embodiments of the present disclosure is not limited to the above-mentioned devices.

Herein, the term "user" may indicate a person who uses an electronic device or a device (e.g., an artificial intelligence electronic device) that uses the electronic device.

FIG. 1 illustrates a network environment including an electronic device according to various embodiments of the disclosure.

The electronic device 101 in the network environment 100, according to the various embodiments, will be described below with reference to FIG. 1. The electronic device 101 may include a bus 110, at least one processor 120, a memory 130, an input/output interface 150, a display 160, and a communication interface 170. In an embodiment, at least one of the elements of the electronic device 101 may be omitted, or other elements may be additionally included in the electronic device 101.

The bus 110 may include, for example, a circuit that interconnects the elements 110 to 170 and transfers communication (e.g., a control message and/or data) between the elements.

The at least one processor 120, which constitutes at least one processor or microprocessor having hardware circuitry configured for operation, may include one or more of a central processing unit (CPU), an application processor (AP), and a communication processor (CP). The at least one processor 120 may, for example, perform an operation or data processing on control and/or communication of at least one other element of the electronic device 101.

The memory 130 may include a volatile memory and/or a non-volatile memory. The memory 130 may store, for example, instructions or data (e.g. motion patten information, motion data) relevant to at least one other element of the electronic device 101. According to an embodiment, the memory 130 may store software and/or a program 140. For example, the program may include a kernel 141, middleware 143, an application programming interface (API) 145, and an application (or "application program") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented by the other programs (e.g., the middleware 143, the API 145, or the application 147). Furthermore, the kernel 141 may provide an interface through which the middleware 143, the API 145, or the application 147 may access the individual elements of the electronic device 101 to control or manage the system resources.

The middleware 143, for example, may function as an intermediary for allowing the API 145 or the application 147 to communicate with the kernel 141 to exchange data.

In addition, the middleware 143 may process one or more task requests received from the application 147 according to priorities thereof. For example, the middleware 143 may assign priorities for using the system resources (e.g., the bus 110, the processor 120, the memory 130, or the like) of the electronic device 101, to at least one of the application 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, or text control.

The input/output interface 150 (e.g., including input/output circuitry), for example, may function as an interface that may transfer instructions or data input from a user or another external device to the other element(s) of the electronic device 101. For example, under a broad interpretation, the input/output interface 150 may constitute an input interface and/or an output interface. Furthermore, the input/output interface 150 may output the instructions or data received from the other element(s) of the electronic device 101 to the user or another external device.

Examples of the display 160 (e.g., including display circuitry) may include a Liquid Crystal Display (LCD), a Light-Emitting Diode (LED) display, an Organic Light-Emitting Diode (OLED) display, a MicroElectroMechanical Systems (MEMS) display, and an electronic paper display. The display 160, for example, may display various types of content (e.g., text, images, videos, icons, or symbols) to the user. The display 160 may include a touch screen and receive, for example, a touch, gesture, proximity, or hovering input using an electronic pen or the user's body part.

The communication interface 170 (e.g., including communication circuitry), for example, may set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (W-CDMA), Universal Mobile Telecommunications System (UMTS), WiBro (Wireless Broadband), and Global System for Mobile Communications (GSM), as a cellular communication protocol. In addition, the wireless communication may include, for example, short range communication 164. The short-range communication 164 may be performed by using at least one of, for example, Wi-Fi, Bluetooth, Near Field Communication (NFC), and Global Navigation Satellite System (GNSS). The GNSS may include at least one of, for example, a Global Positioning System (GPS), a Global navigation satellite system (Glonass), a Beidou navigation satellite system (hereinafter, referred to as "Beidou"), and Galileo (European global satellite-based navigation system). Hereinafter, in the present disclosure, the "GPS" may be interchangeably used with the "GNSS". The wired communication may include at least one of, for example, a Universal Serial Bus (USB), a High Definition Multimedia Interface (HDMI), Recommended Standard-232 (RS-232), and a Plain Old Telephone Service (POTS). The network 162 may include at least one of a communication network such as a computer network (e.g., a LAN or a WAN), the Internet, and a telephone network.

Each of the first and second external electronic devices 102 and 104 may be of a type identical to or different from that of the electronic device 101. According to an embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106) instead of performing the functions or services by itself or in addition. Another electronic device (e.g., the electronic device 102 or 104, or the server 106) may execute the requested functions or the additional functions, and may deliver a result of the execution to the electronic device 101. The electronic device 101 may process the received result as it is or additionally to provide the requested functions or services. To achieve this provision of the requested functions, for example, cloud computing, distributed computing, or client-server computing technology may be used.

Figure 2:
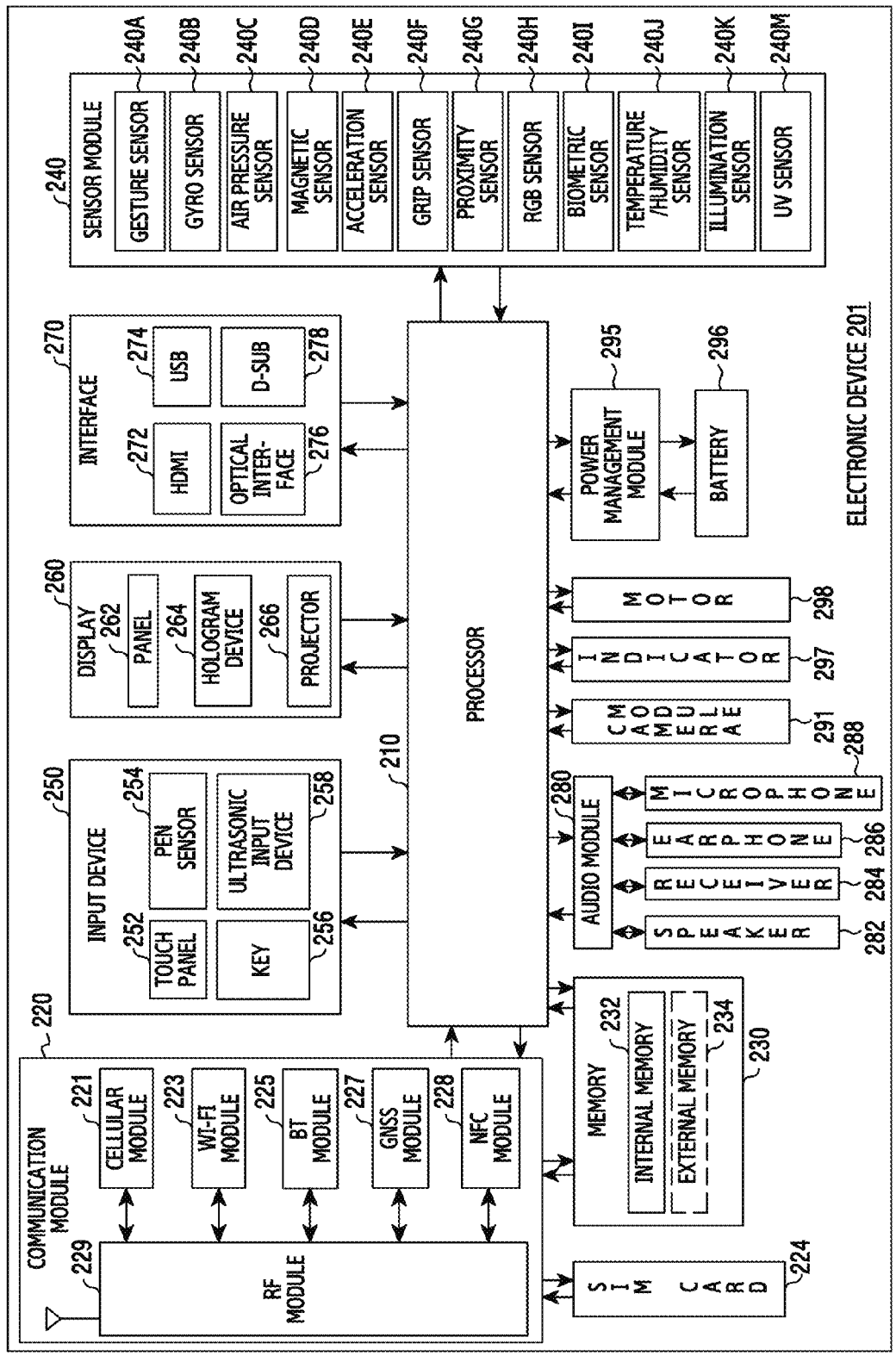
FIG. 2 is a block diagram of an electronic device, according to various embodiments of the present disclosure.

FIG. 2 is a block diagram of an electronic device 201 according to various embodiments of the disclosure. Referring now to FIG. 2, the electronic device 201 may include, for example, all or a part of the electronic device 101 illustrated in FIG. 1. The electronic device 201 may include at least one application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may, for example, control a plurality of hardware or software elements connected thereto and perform a variety of data processing and calculations by driving an operating system or application programs. The AP 210 comprises hardware and may be implemented as, for example, a system on chip (SoC). According to an embodiment, the AP 210 may further include a graphic processing unit (GPU) and/or an image signal processor. The AP 210 may include at least some of the elements (e.g., a cellular module 221) illustrated in FIG. 2. The AP 210 may load commands or data, received from at least one other element (e.g., a non-volatile memory), in a volatile memory to process the loaded commands or data, and may store various types of data in the non-volatile memory.

The communication module 220 may have a configuration that is the same as or similar to that of the communication interface 160 of FIG. 1. The communication module 220 may include, for example, a cellular module 221, a Wi-Fi module 223, a BT module 225, a GPS module 227, an NFC module 228, and a radio frequency (RF) module 229. The communication module 220 provides a function of transmitting/receiving a signal. Accordingly, the communication module 220 may be referred to as a "reception unit/receiver", a "transmission unit/transmitter", a "transmission and reception unit/transceiver", a "communication unit", or the like. The communication module comprises hardware such as, for example, one or more of a transmitter, receiver, or transceiver. The cellular module 221 may provide, for example, a voice call, a video call, a text message service, or an Internet service through a communication network. According to an embodiment, the cellular module 221 may distinguish and authenticate the electronic device 201 in the communication network by using a subscriber identification module (e.g., the SIM card 224). According to an embodiment, the cellular module 221 may perform at least some of the functions that the AP 210 may provide. According to an embodiment, the cellular module 221 may include a communication processor (CP).

The Wi-Fi module 223, the BT module 225, the GPS module 227, or the NFC module 228 may include, for example, at least one processor for processing data transmitted/received through the corresponding module. According to an embodiment, at least some (e.g., two or more) of the cellular module 221, the Wi-Fi module 223, the BT module 225, the GPS module 227, and the NFC module 228 may be included in a single integrated chip (IC) or IC package.

The RF module 229 may, for example, transmit/receive a communication signal (e.g., an RF signal). The RF module 229 may include, for example, a transceiver, a power amp module (PAM), a frequency filter, a low noise amplifier (LNA), or an antenna. According to another embodiment, at least one of the cellular module 221, the Wi-Fi module 223, the BT module 225, the GPS module 227, and the NFC module 228 may transmit/receive an RF signal through a separate RF module.

The SIM card 224 may include, for example, a card including a subscriber identification module and/or an embedded SIM, and may further include unique identification information (e.g., an integrated circuit card identifier (ICCID)) or subscriber information (e.g., international mobile subscriber identity (IMSI)).

The memory 230 may include, for example, an internal memory 232 and/or an external memory 234. The internal memory 232 may include, for example, at least one of a volatile memory (e.g., a dynamic random access memory (DRAM), a static RAM (SRAM), a synchronous dynamic RAM (SDRAM), or the like) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, or a solid state drive (SSD)).

The external memory 234 may further include a flash drive, for example, a compact flash (CF), a secure digital (SD), a micro secure digital (Micro-SD), a mini secure digital (Mini-SD), an extreme digital (xD), a memory stick, or the like. The external memory 234 may be functionally and/or physically connected to the electronic device 201 through various interfaces.

The sensor module 240 may, for example, measure a physical quantity or detect an operating state of the electronic device 201, and may convert the measured or detected information into an electrical signal. The sensor module 240 comprises hardware and may include, for example, at least one of, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, and blue (RGB) sensor), a bio-sensor 240I, a temperature/humidity sensor 240J, an illumination sensor 240K, and a ultra violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In an embodiment, the electronic device 201 may further include at least one processor that is configured as a part of the AP 210 or a separate element from the AP 210 in order to control the sensor module 240, thereby controlling the sensor module 240 while the AP 2710 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, and an ultrasonic type. In addition, the touch panel 252 may further include a control circuit. The touch panel 252 may further include a tactile layer to provide a tactile reaction to a user.

The (digital) pen sensor 254 may be, for example, a part of the touch panel, or may include a separate recognition sheet. The key 256 may include, for example, a physical button, an optical key, or a keypad. The ultrasonic input device 258 may identify data by detecting acoustic waves with a microphone (e.g., a microphone 288) of the electronic device 201 through an input unit for generating an ultrasonic signal.

The display 260 (e.g., the display 160) may include a panel 262, a hologram device 264, or a projector 266. The panel 262 may include a configuration that is the same as or similar to that of the display 160 of FIG. 1. The panel 262 may be implemented to be, for example, flexible, transparent, or wearable. The panel 262 may be configured as a single module integrated with the touch panel 252. The hologram device 264 may show a stereoscopic image in the air using interference of light. The projector 266 may project light onto a screen to display an image. The screen may be located, for example, in the interior of or on the exterior of the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-subminiature (D-sub) 278. The interface 270 may be included in, for example, the communication interface 160 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may, for example, include hardware to convert a sound/vibration into an electrical signal, and vice versa. At least some elements of the audio module 280 may be included in, for example, the input/output interface 140 illustrated in FIG. 1. The audio module 280 may, for example, process sound information that is input or output through the speaker 282, the receiver 284, the earphones 286, the microphone 288, or the like. and including an integrated circuit such as an audio processor.

The camera module 291 may be, for example, a device that can take a still image or a moving image, and according to an embodiment, the camera module 291 may include hardware such one or more image sensors (CCD, CMOS, for example) (e.g., a front sensor or a rear sensor), at least lens, an image signal processor (ISP) comprising a an integrated circuit, or a flash (e.g., an LED or a xenon lamp).

The power management module 295 may, for example, manage power of the electronic device 201. According to an embodiment, the power management module 295 may include a Power Management Integrated Circuit (PMIC), a charger IC, or a battery or fuel gauge. The PMIC may use a wired and/or wireless charging method. Examples of the wireless charging method may include, for example, a magnetic resonance scheme, a magnetic induction scheme, an electromagnetic wave scheme, and the like. Further, the power management module 295 may further include additional circuits (e.g., a coil loop, a resonance circuit, a rectifier, etc.) for wireless charging. The battery gauge may measure, for example, a residual quantity of the battery 296, and a voltage, a current, or a temperature during the charging. The battery 296 may include, for example, a rechargeable battery and/or a solar battery.

The indicator 297 may indicate a specific state of the electronic device 201 or a part thereof (e.g., the AP 210), for example, a booting state, a message state, a charging state, or the like. The motor 298 may convert an electrical signal into a mechanical vibration, and may generate a vibration or haptic effect. Although not illustrated, the electronic device 201 may include a processing unit (e.g., a GPU) for mobile TV support. The processing device for mobile TV support may, for example, process media data according to a standard of digital multimedia broadcasting (DMB), digital video broadcasting (DVB), media flow, or the like.

Each of the components of the electronic device according to the present disclosure may be implemented by one or more components and the name of the corresponding component may vary depending on a type of the electronic device. In various embodiments, the electronic device may include at least one of the above-described elements. Some of the above-described elements may be omitted from the electronic device, or the electronic device may further include additional elements. Further, some of the elements of the electronic device according to various embodiments of the present disclosure may be coupled to form a single entity while performing the same functions as those of the corresponding elements before the coupling.

Figure 3:
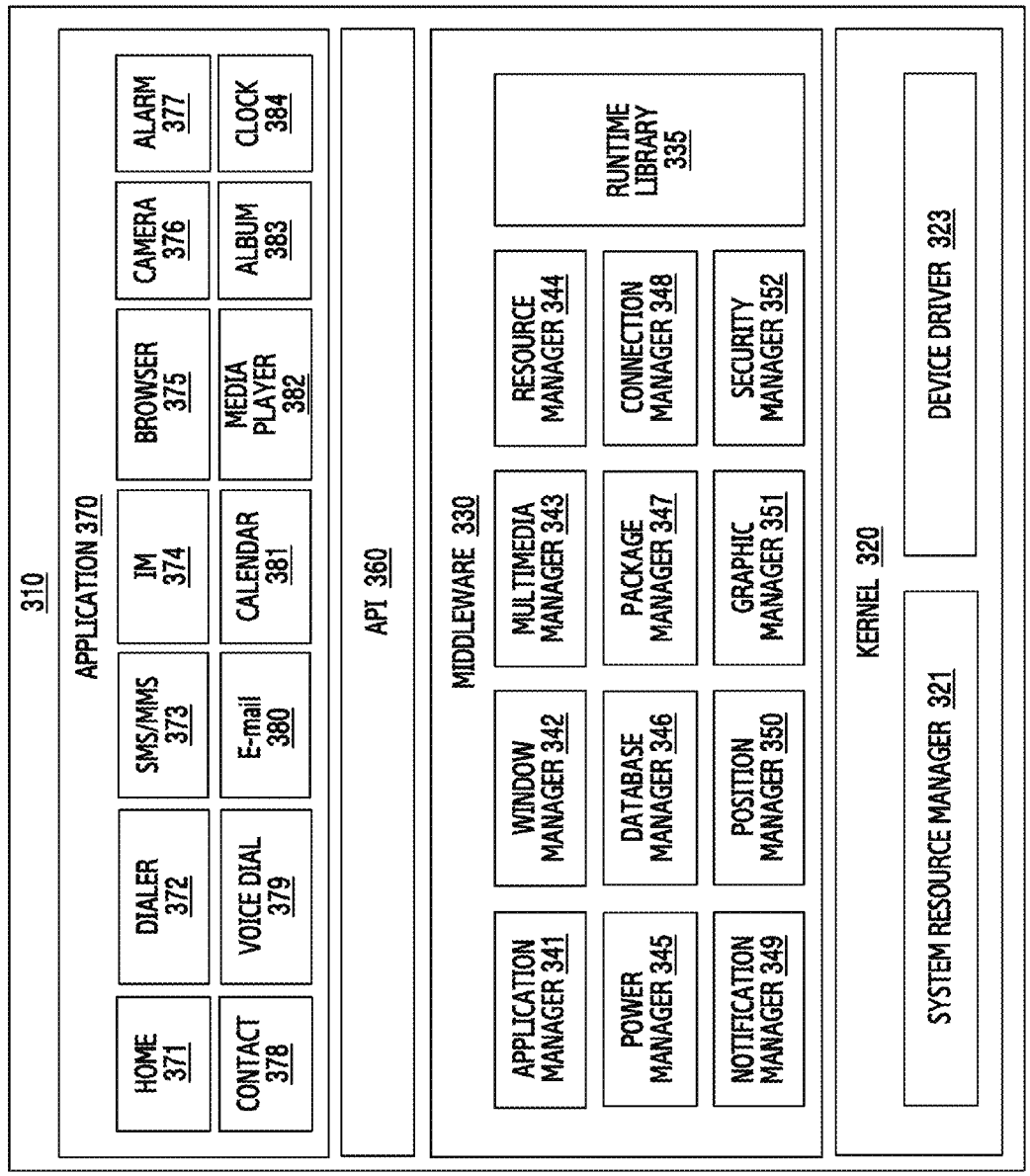
FIG. 3 is a block diagram of a program module, according to various embodiments of the present disclosure.

FIG. 3 is a block diagram of a program module 310 according to various embodiments. According to an embodiment, the program module 310 (e.g., the program 140) may include an operating system (OS) that controls resources relating to an electronic device (e.g., the electronic device 101) and/or various applications (e.g., the application 147) executed in the operating system. The operating system may be, for example, Android, iOS™, Windows™, Symbian™, Tizen™, Bada™, or the like.

The programming module 310 may include a kernel 320, middleware 330, an application programming interface (API) 360, and/or applications 370. At least some of the program module 310 may be preloaded in the electronic device, or may be downloaded from a external electronic device (e.g., the electronic device (102, 104), the server 106). These items can be executed, for example, by integrated circuit(s).

The kernel 320 (e.g., the kernel 141 of FIG. 1) may include, for example, a system resource manager 321 or a device driver 323. The system resource manager 321 may control, allocate, or collect system resources. According to an embodiment, the system resource manager 321 may include a process management unit, a memory management unit, or a file system management unit. The device driver 323 may include, for example, a display driver, a camera driver, a Bluetooth driver, a shared-memory driver, a USB driver, a keypad driver, a Wi-Fi driver, an audio driver, or an inter-process communication (IPC) driver.

The middleware 330 may provide a function required by the applications 370 in common, or may provide various functions to the applications 370 through the API 360 to enable the applications 370 to efficiently use limited system resources in the electronic device. According to an embodiment, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a complier in order to add a new function through a programming language during the execution of the applications 370. The run time library 335 may perform input/output management, memory management, or a function for an arithmetic function.

The application manager 341 may manage, for example, a life cycle of at least one of the applications 370. The window manager 342 may manage GUI resources used by a screen. The multimedia manager 343 may identify a format required for reproducing various media files, and may encode or decode a media file using a codec suitable for the corresponding format. The resource manager 344 may manage resources of at least one of the applications 370, such as a source code, a memory, a storage space, and the like.

The power manager 345 may operate together with, for example, a basic input/output system (BIOS) to manage a battery or power and provide power information required for an operation of the electronic device. The database manager 346 may generate, search, or change a database to be used by at least one of the applications 370. The package manager 347 may manage installation or update of an application distributed in the format of a package file.

The connectivity manager 348 may manage, for example, a wireless connection, such as Wi-Fi or Bluetooth. The notification manager 349 may display or notify of an event, such as a received message, an appointment, and a proximity notification, in such a manner as not to disturb a user. The location manager 350 may manage location information of the electronic device. The graphic manager 351 may manage a graphic effect to be provided to a user, or a user interface related thereto. The security manager 352 may provide all security functions required for system security or user authentication. According to an embodiment, in cases where the electronic device (e.g., the electronic device 101) has a telephone call function, the middleware 330 may further include a telephony manager for managing a voice or video call function of the electronic device.

The middleware 330 may include a middleware module that forms combinations of various functions of the aforementioned elements. The middleware 330 may provide specialized modules according to the types of operating systems in order to provide differentiated functions. In addition, the middleware 330 may dynamically delete some of the existing elements, or may add new elements.

The API 360 (e.g., the API 145) may be, for example, a set of API programming functions, and may be provided with different configurations according to operating systems. For example, in the case of Android or iOS, one API set may be provided for each platform, and in the case of Tizen, two or more API sets may be provided for each platform.

The applications 370 (e.g., the application 147) may include, for example, one or more applications that can provide functions, such as home 371, dialer 372, SMS/MMS 373, instant message (IM) 374, browser 375, camera 376, alarm 377, contact 378, voice dialer 379, e-mail 380, calendar 381, media player 382, album 383, clock 384, health care (e.g., to measure exercise quantity or blood sugar), or environment information (e.g., atmospheric pressure, humidity, or temperature information).

According to an embodiment, the applications 370 may include an application (hereinafter, referred to as an "information exchange application" for convenience of the description) that supports information exchange between the electronic device (e.g., the electronic device 101) and external electronic devices (e.g., the electronic devices 102 and 104). The information exchange application may include, for example, a notification relay application for transmitting specific information to the external electronic device, or a device management application for managing the external electronic device.

For example, the notification relay application may include a function of transferring, to an external electronic device (e.g., the electronic device 102 or 104), notification information generated from other applications of the electronic device (e.g., an SMS/MMS application, an e-mail application, a health management application, or an environmental information application, (just to name a few non-limiting possibilities). Furthermore, the notification relay application may, for example, receive notification information from an external electronic device and provide the received notification information to a user. The device management application may, for example, manage (e.g., install, delete, or update) at least one function of an external electronic device (e.g., the electronic device 104) communicating with the electronic device (for example, a function of turning on/off the external electronic device itself (or some elements thereof), or a function of adjusting luminance (or a resolution) of the display), applications operating in the external electronic device, or services provided by the external electronic device (e.g., a telephone call service or a message service).

According to an embodiment, the applications 370 may include an application (e.g., a health care application) specified according to attributes (e.g., attributes of the electronic device such as the type of electronic device which corresponds to a mobile medical device) of the external electronic device (e.g., the electronic device 102 or 104). According to one embodiment, the applications 370 may include an application received from an external electronic device (e.g., the server 106 or the electronic device 102 or 104). According to an embodiment, the applications 370 may include a preloaded application or a third party application that can be downloaded from a server. The names of the elements of the program module 310, according to the embodiment illustrated in the drawing, may vary according to the type of operating system.

According to various embodiments, at least a part of the programming module 310 may be implemented in software, firmware, hardware, or a combination of two or more thereof. At least some of the programming module of the at least one processor may be implemented (for example, executed) by, for example, the processor (for example, the AP 210). At least some of the programming module 310 may include, for example, a module, program, routine, sets of instructions, process, or the like for performing one or more functions.

Figure 4:
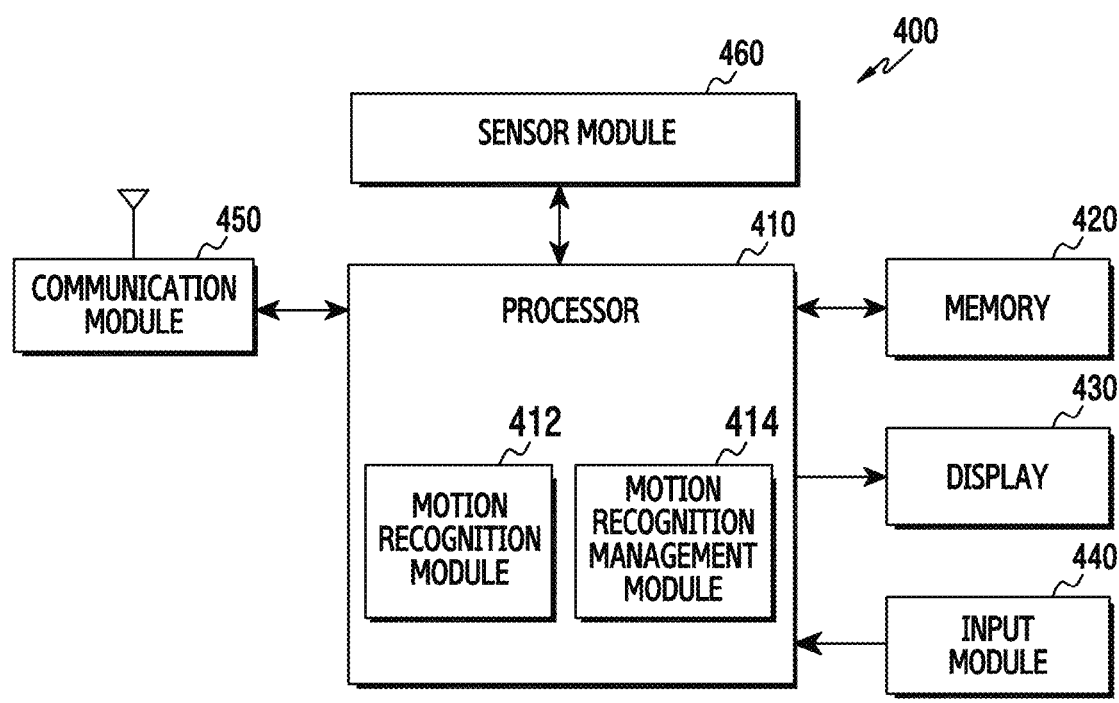
FIG. 4 is a block diagram of an electronic device for creating or updating a motion pattern, according to various embodiments of the present disclosure.

FIG. 4 is a block diagram of an electronic device for creating or updating a motion pattern, according to various embodiments of the present disclosure. The electronic device 400, for example, may include all or some of the elements of the electronic device 101 of FIG. 1 or the electronic device 201 of FIG. 2.

Referring now to FIG. 4, the electronic device 400 (e.g., the electronic device 101 of FIG. 1 or the electronic device 201 of FIG. 2) may include at least one processor 410 (e.g., including processing circuitry), a memory 420, a display 430 (e.g., including display circuitry), an input module 440 (e.g., including input circuitry), a communication module 450 (e.g., including communication circuitry), and a sensor module 460 (e.g., including sensor circuitry).

The electronic device 400 may include at least one processor 410 (e.g., at least the processor 120 of FIG. 1 or the processor 210 of FIG. 2, and there can be multiple processors). The at least one processor 410 may include a central processing unit (CPU), an application processor (AP), or a communications processor (CP).

The at least one processor 410 may include a motion recognition module 412 and a motion recognition management module 414. For example, if the at least one processor 410 detects the motion of the electronic device 400 through the sensor module 460 or detects the occurrence of a motion recognition event, the at least one processor 410 may convert the motion recognition module 412 that operates in an inactive mode into an active mode.

The motion recognition module 412 may compare motion data that is detected through the sensor module 460 with a motion pattern that is stored in the memory 420 in order to thereby determine the user's motion. For example, the motion recognition module 412 may compare the motion data that is detected through the sensor module 460 with the trajectory, the speed, the intensity, and the cycle of a motion pattern that is stored in the memory 420 in order to thereby recognize the user's motion. Here, the motion data may refer to the data that is based on at least one of a coordinate change (translation) and a posture change (rotation on each axis) of the electronic device 400 (e.g., a sensed target of the sensor module 460). For example, the motion data may include a coordinate change, speed, acceleration, a rotational angle of each axis, or the like.

According to an embodiment, the motion recognition module 412 may control the memory 420 to store the motion data corresponding to the motion pattern. Here, the motion pattern for the user's motion may be comprised of one or more pieces of motion data. For example, the motion pattern may be comprised of the rotational angle, the acceleration, or the rotation intensity for one cycle with respect to a specific motion of the user.

According to an embodiment, the motion recognition module 412 may also provide execution information (e.g., execution time, the number of times, the amount of exercise, etc.) on the recognized motion. For example, the motion recognition module 412 may control the display 430 to display the motion execution information.

According to an embodiment, if the motion recognition module 412 recognizes a user's motion, the motion recognition module 412 may then provide exercise guide information based on difference information between the motion data and the motion pattern. For example, the motion recognition module 412 may control the display 430 to display the exercise guide information.

According to an embodiment, the motion recognition module 412 may determine the user's motion based on motion recognition information of another electronic device (e.g., the electronic device 102 of FIG. 1). For example, if the motion recognition module 412 detects the same motion as another electronic device at the same time, the motion recognition module 412 may determine the corresponding motion as the user's motion. Here, another electronic device may refer to a nearby electronic device that is connected to interwork with the electronic device 400 for the motion recognition.

The motion recognition management module 414 may also create or update a motion pattern for the motion recognition of the motion recognition module 412 based on the motion data. Here, the motion data may include at least one piece (portion) of sensor data that is detected through the sensor module 460 or log data that is stored in the memory 420.

According to an embodiment, if the motion recognition management module 414 fails to detect a motion pattern corresponding to the motion data in the motion recognition module 412, the motion recognition management module 414 may create a motion pattern corresponding to the motion data. For example, the motion recognition management module 414 may extract at least one cycle of a pattern from among the repeated pattern of the motion data. The motion recognition management module 414 may extract features (attributes) of at least one cycle of a pattern (e.g., average, dispersion, a waveform peak value, and an absolute value, the amount of change, and distance of a valley value, or the like). The motion recognition management module 414 may create a new motion pattern based on the extracted features of at least one cycle of a pattern. The motion recognition management module 414 may also configure the name of the new motion pattern based on user input information or motion pattern-related information that is received from a server.

According to an embodiment of the present disclosure, the motion recognition management module 414 may create a motion pattern corresponding to the motion data that is detected after a motion pattern creation event occurs. For example, the motion recognition management module 414 may identify whether or not there is the existence of a motion pattern that corresponds to the motion data detected after the occurrence of the motion pattern creation event. If the motion recognition management module 414 is not able to detect the motion pattern corresponding to the motion data, the motion recognition management module 414 may extract the attributes (features) of the motion data (e.g., average, dispersion, a waveform peak value, and the amount of change, and distance of a valley value, or the like). The motion recognition management module 414 may create a new motion pattern based on the features (attributes) of the motion data.

According to an embodiment of the present disclosure, the motion recognition management module 414 may create and/or update the motion pattern based on one or more pieces of motion data obtained through the electronic device 400 and one or more other electronic devices that are connected with the electronic device 400 by using at least one short-range wireless communication scheme. For example, the motion recognition management module 414 may create and/or update the motion pattern based on the sensor data that is obtained through the sensor module 460 of the electronic device 400 and the sensor data that is obtained through the sensor module of another electronic device.

According to an embodiment of the present disclosure, the motion recognition management module 414 may create the motion pattern by interworking with another electronic device. For example, if the motion recognition module 412 detects a different motion from another electronic device, which interworks for the motion recognition, at the same time, the motion recognition management module 414 may create a new motion pattern that corresponds to the motion data detected through the sensor module 460. The motion recognition management module 414 may configure the name of the newly created motion pattern based on the name of the motion pattern of another electronic device.

According to an embodiment of the present disclosure, the motion recognition management module 414 may update the motion pattern based on the motion data corresponding to the motion pattern. For example, the motion recognition management module 414 may update (e.g., extend, reduce, or shift) the recognition range of the motion pattern based on one or more pieces of motion data (e.g., the motion data stored in the memory 420) corresponding to the motion pattern. For example, the motion recognition management module 414 may transform the pattern structure of the motion pattern based one or more pieces of motion data corresponding to the motion pattern.

The memory 420 may store instructions or data related to elements that constitute the electronic device. According to an embodiment of the present disclosure, the memory 420 may store a motion pattern and motion data corresponding to the motion pattern.

The display 430 may display a variety of content (e.g., text, images, videos, icons, or symbols) to the user.

The input module 440 may transfer instructions or data for controlling the operation of the electronic device, which are input from the user or other external devices, to other elements of the electronic device. For example, the input module 440 may include a keypad, a dome switch, physical buttons, a touch pad (a pressure-sensitive/capacitive type), a jog & shuttle, or the like.

The communication module 450 includes at least a transmitter, receiver or transceiver may transmit and receive signals between the electronic device 400 and external devices (e.g., other electronic devices or a server). The communication module 450 may include both a cellular module and a non-cellular module. The non-cellular module may enable the communication between the electronic device 400 and other electronic devices and/or a server by using a short-range wireless communication scheme. The short-range wireless communication scheme may include at least one communication scheme of WiFi, Bluetooth, BLE, NFC, ZigBee, or the like. For example, the communication module 450 may be connected to a network through wireless communication and/or wired communication in order to thereby communicate with the external devices.

The sensor module 460 may convert (i.e. transduce) measurement information of the physical quantity or detected information on the operational status of the electronic device into an electric signal in order to thereby create sensor data. For example, the sensor module 460 may include an accelerometer, a geomagnetic sensor, a gyro sensor, or the like. For example, the sensor module 460 may further include a control circuit for controlling one or more sensors included in the sensor module 460.

According to various embodiments of the present disclosure, the electronic device may include: a sensor module that is configured to detect one or more pieces of sensor data corresponding to the motion of the electronic device; at least one processor that is electrically connected with the sensor module; and a memory that is electrically connected with the processor, and stores instructions that, when executed, allow the processor to detect the one or more pieces of sensor data by using the sensor module, to identify whether or not there is a motion pattern corresponding to the one or more pieces of sensor data in the memory, and to create a motion pattern based on at least some (e.g. a part of portion) of the one or more pieces of sensor data according to whether or not there is the motion pattern corresponding to the one or more pieces of sensor data.

According to various embodiments of the present disclosure, the executed instructions may cause the processor to: extract at least one cycle of a pattern from the pattern contained in the one or more pieces of sensor data; and create the motion pattern based on the features (attributes) that are contained in the one or more cycles of a pattern.

According to various embodiments of the present disclosure, the features (attributes) contained in the one or more cycles of a pattern may include at least one of an average, dispersion, a cycle, a peak value of a waveform of the sensor data, and/or an absolute value, dispersion, distance, and the amount of change of a valley value, and/or distance.

According to various embodiments of the present disclosure, the instructions may allow the processor to: identify whether or not the one or more pieces of sensor data contain a repeated pattern; if the one or more pieces of sensor data contain the repeated pattern, extract at least one cycle of a pattern from the repeated pattern contained in the one or more pieces of sensor data; and create the motion pattern based on the features (attributes) that are contained in the one or more cycles of a pattern.

According to various embodiments of the present disclosure, the instructions may allow the processor to create a new motion pattern based on the one or more pieces of sensor data and one or more pieces of log data corresponding to the sensor data, which is stored in the memory.

According to various embodiments of the present disclosure, the instructions may allow the processor to collect execution information on the motion pattern in response to the existence of the motion pattern corresponding to the one or more pieces of sensor data.

According to various embodiments of the present disclosure, the electronic device may include: a sensor module that is configured to detect one or more pieces of sensor data corresponding to the motion of the electronic device; at least one processor that is electrically connected with the sensor module; and a memory that is electrically connected with the at least one processor, and stores instructions that, when executed, configures the at least one processor to detect the one or more pieces of sensor data by using the sensor module, to detect a motion pattern corresponding to the one or more pieces of sensor data, and to update the motion pattern based on at least some of the one or more pieces of sensor data.

According to various embodiments of the present disclosure, the instructions may configure the at least one processor: to compare waveforms of the one or more pieces of sensor data with one or more motion patterns that are stored in the memory, and to detect the motion pattern corresponding to the one or more pieces of sensor data based on the comparison result.

According to various embodiments of the present disclosure, the instructions may allow the at least one processor to update the recognition range or the pattern structure of the motion pattern based on at least some of the one or more pieces of sensor data.

According to various embodiments of the present disclosure, the instructions may allow the at least one processor to reduce the recognition range of the motion pattern in response to a recognition error for the motion pattern.

According to various embodiments of the present disclosure, the instructions may allow the at least one processor to collect execution information on the motion pattern.

According to various embodiments of the present disclosure, the instructions may allow the at least one processor to update the motion pattern based on the one or more pieces of sensor data and one or more pieces of log data corresponding to the one or more pieces of sensor data, which is stored in the memory.

According to various embodiments of the present disclosure, the electronic device may include: a sensor module that is configured to sense (e.g. detect) one or more pieces of sensor data corresponding to the motion of the electronic device; at least one processor that is electrically connected with the sensor module; and a memory that is electrically connected with the at least one processor, and the memory stores instructions that, when executed by the at least one processor, configures the at least one processor to detect one or more pieces of sensor data by using the sensor module, to detect a motion pattern corresponding to the one or more pieces of sensor data, to compare the one or more pieces of sensor data with the motion pattern, and to provide information for changing the motion based on at least some of the comparison result.

According to various embodiments of the present disclosure, the instructions may configure the at least one processor to provide the information for changing the motion based on the difference between the one or more pieces of sensor data and at least one of the trajectory, the speed, the intensity, or the cycle of the motion pattern.

According to various embodiments of the present disclosure, the electronic device may further include a display and an audio module, and the instructions may configure the at least one processor to provide the information for changing the motion by using at least one of the display and/or the audio module.

Figure 5:
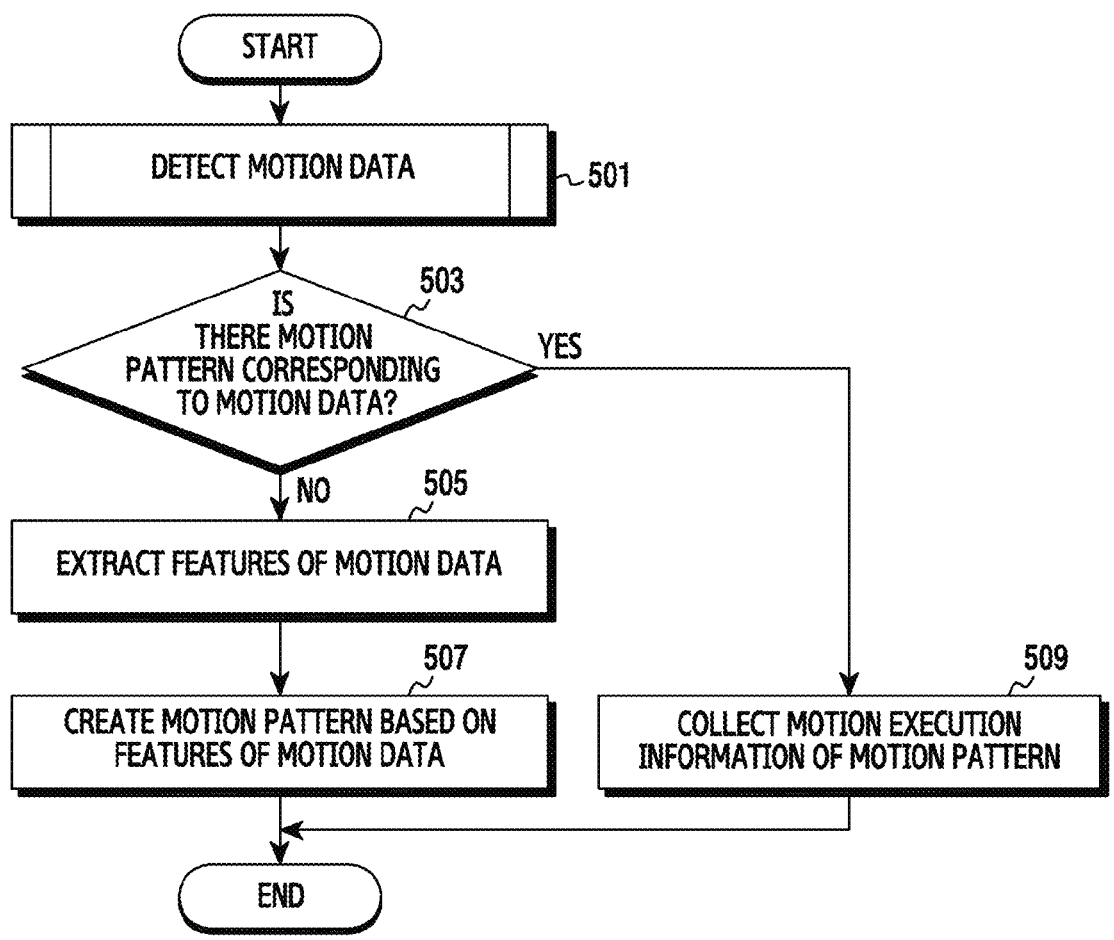
FIG. 5 is a flowchart illustrating operations for creating a motion pattern in the electronic device, according to various embodiments of the present disclosure.

FIG. 5 is a flowchart illustrating operations for creating a motion pattern in the electronic device, according to various embodiments of the present disclosure. Hereinafter, the operation for creating a motion pattern by using a waveform for creating a motion pattern shown in FIGS. 6A and 6B will be described. In addition, the operation for displaying recognition information of the motion pattern by using a screen configuration shown in FIG. 7 will be described.

Referring now to FIG. 5, in operation 501, the electronic device (e.g., the electronic device 101, 201, or 400) may detect one or more pieces of motion data (sensor data) through a sensor module (e.g., the sensor module 460 of FIG. 4).

In operation 503, the electronic device may identify whether or not there is a motion pattern corresponding to the motion data. For example, referring to diagram FIG. 6A, the motion recognition module 412 of the at least one processor 410 may identify whether or not the waveform 610 of the motion data detected through the sensor module 460 is contained within the recognition range 602 of the waveform 600 of the motion pattern that is stored in the memory 420. If the waveform 610 of the motion data is contained within the recognition range 602 of the waveform 600 of the motion pattern, the motion recognition module 412 may detect the corresponding motion pattern as the motion pattern corresponding to the motion data. At this time, the motion recognition module 412 may determine whether or not the waveform 610 of the motion data is contained within the recognition range 602 of the waveform 600 of the motion pattern based on the containing ratio of the waveform 610 of the motion data with respect to the recognition range 602 of the waveform 600 of the motion pattern.

In operation 505, when the electronic device fails to detect the motion pattern corresponding to the motion data, the electronic device may extract the features of the motion data. For example, if the motion recognition module 412 determines that the waveform 610 of the motion data is not within the recognition range 602 of the waveform 600 of the motion pattern, the motion recognition management module 414 may extract the features (i.e. attributes) of the motion data (e.g., average, dispersion, a waveform peak value, and the amount of change and distance of a valley value, or the like).

Figures 6A, 6B:
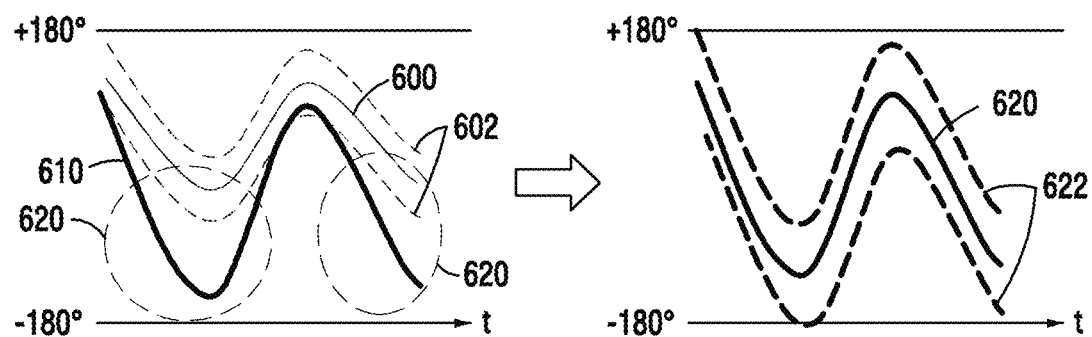
FIG. 6A and FIG. 6B show a waveform for creating a motion pattern, according to various embodiments of the present disclosure.

In operation 507, the electronic device may create a motion pattern based on the features of the motion data. For example, the motion recognition management module 414 may create a new motion pattern 620 corresponding to the waveform of the motion data, as shown in FIG. 6B. The motion recognition module 412 may configure a recognition range 622 of the new motion pattern 620.

Figures 7A, 7B:
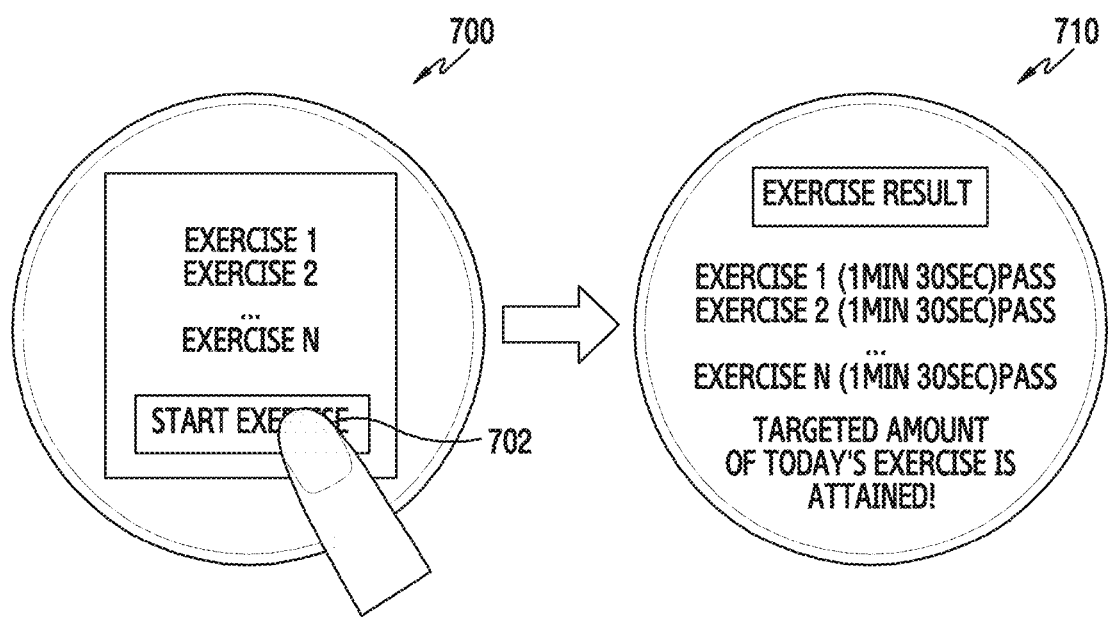
FIG. 7A and FIG. 7B illustrate a screen configuration for displaying recognition information of a motion pattern, according to various embodiments of the present disclosure.

When the motion pattern corresponding to the motion data is detected, the electronic device may collect motion execution information on the motion pattern in operation 509. For example, if the selection 702 for a "Start Exercise" button in the motion recognition service screen 700 is detected in of FIG. 7A, the motion recognition module 412 may detect motion data. If the motion recognition module 412 collects the motion execution information on the motion pattern corresponding to the motion data, as shown in FIG. 7B, the motion recognition module 412 may display the motion execution information 710, such as the execution time, the number of times, or the amount of a motion (exercise), which corresponds the motion pattern, on the display 430.

According to various embodiments of the present disclosure, the electronic device may create a new motion pattern based on the sensor data that is detected through the sensor module and one or more pieces of log data corresponding to the sensor data. Here, one or more pieces of log data corresponding to the sensor data may refer to the log data that includes a waveform similar to the waveform of the sensor data.

Figure 8:
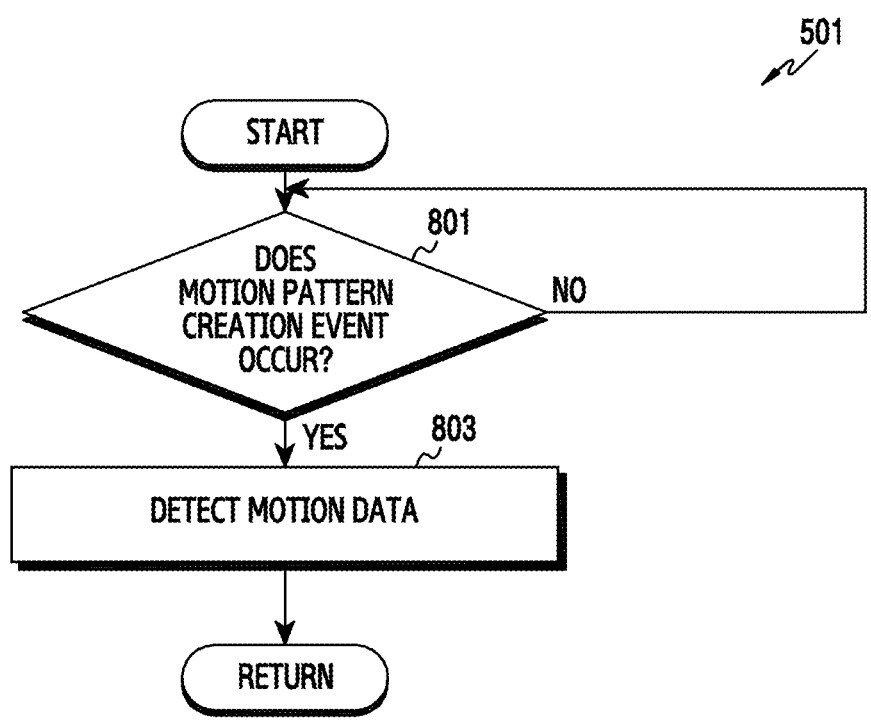
FIG. 8 is a flowchart illustrating operations for detecting motion data in the electronic device, according to various embodiments of the present disclosure.

FIG. 8 is a flowchart illustrating operations for detecting the motion data in the electronic device, according to various embodiments of the present disclosure. Hereinafter, the operation of detecting the motion data in operation 501 of FIG. 5 will be described.

Referring now to FIG. 8, in operation 801, the electronic device (e.g., the electronic device 101, 201, or 400) may identify whether or not an event for the creation of the motion pattern occurs. For example, the motion recognition management module 414 may identify whether or not there is a selection of a motion pattern creation menu through the input information of the input module 440. For example, the motion recognition management module 414 may identify whether or not a gesture corresponding to the motion pattern creation event is detected.

If in operation 801, the electronic device fails to detect the occurrence of the motion pattern creation event, the electronic device may re-identify whether or not an event for the motion pattern creation occurs.

If in operation 803, the electronic device detects the occurrence of the motion pattern creation event, the electronic device may detect motion data through the sensor module.

Figure 9:
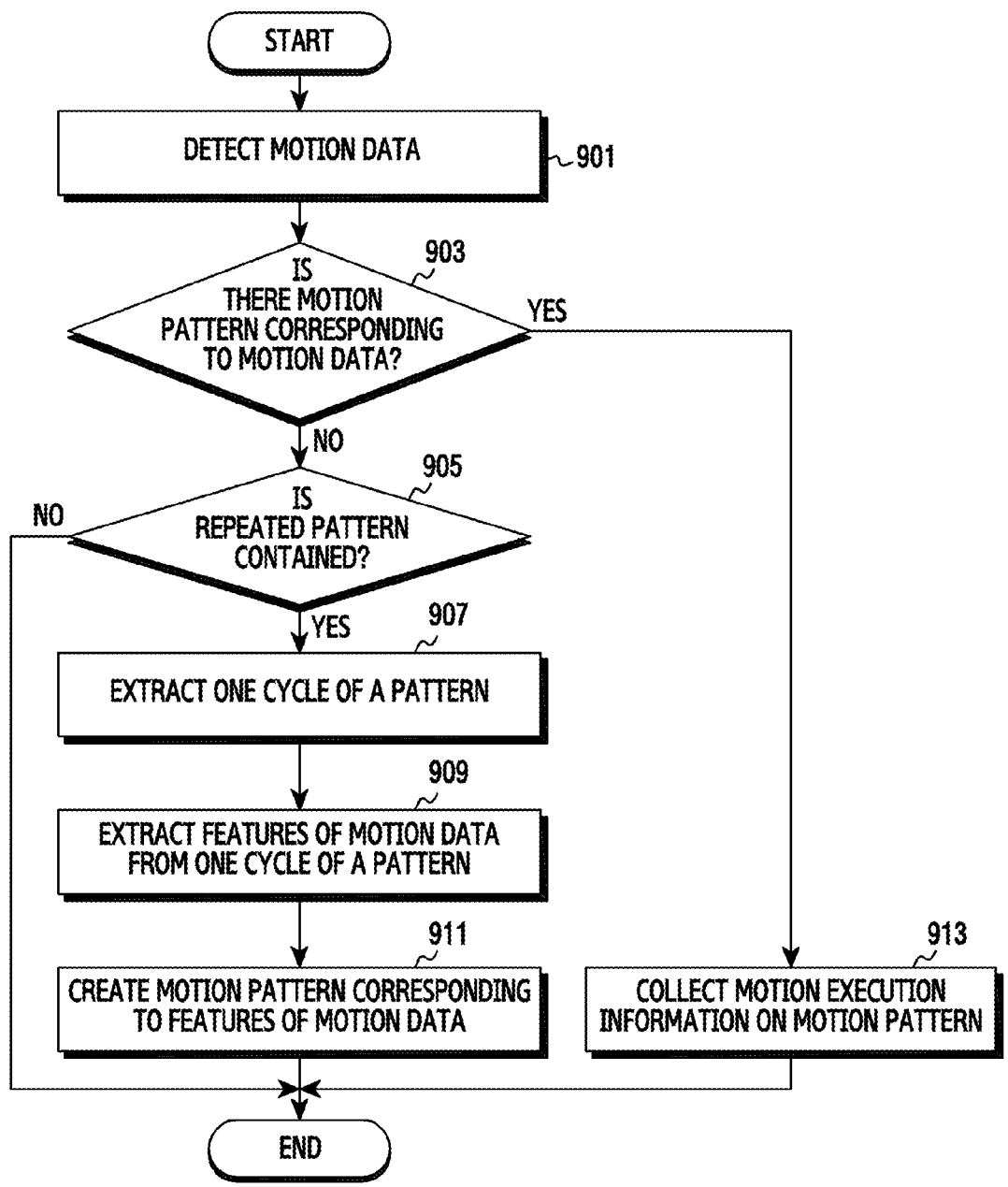
FIG. 9 is a flowchart illustrating operations for creating a motion pattern based on the features (i.e. attributes) of the motion data in the electronic device, according to various embodiments of the present disclosure.
Figure 11A:
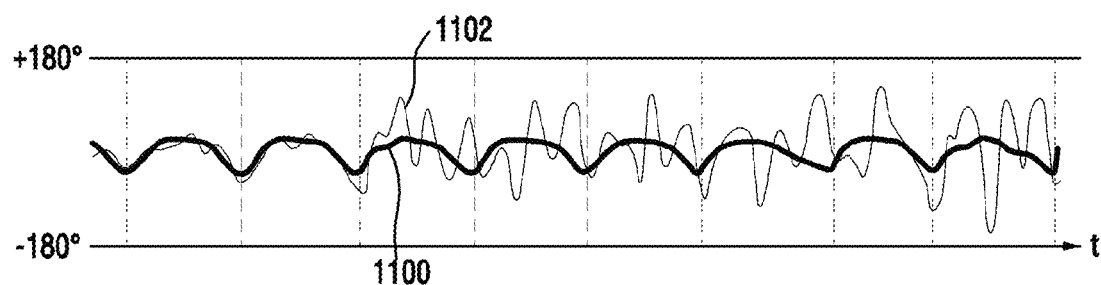
FIG. 11A and FIG. 11B illustrate a waveform of the motion data, according to various embodiments of the present disclosure.
Figure 11B:
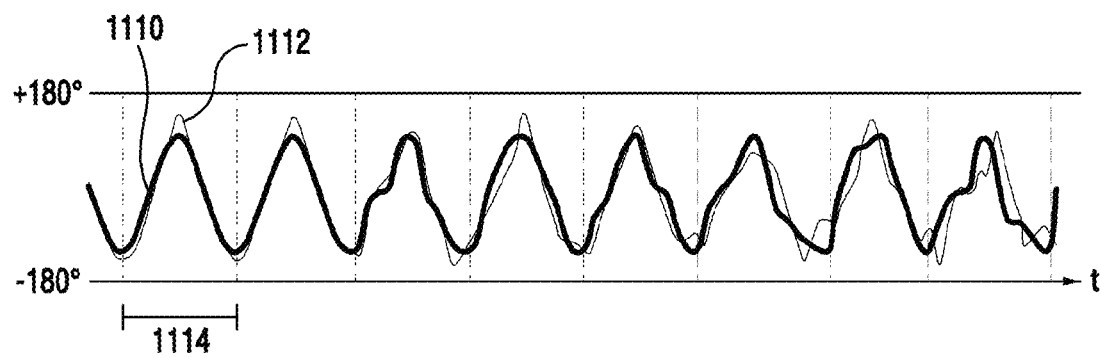

FIG. 9 is a flowchart illustrating operations for creating a motion pattern based on the features of the motion data in the electronic device, according to various embodiments of the present disclosure. The following description will be made of the operation for creating the motion pattern by using a screen configuration shown in FIG. 10 and a waveform of the motion data shown in FIG. 11. Here, FIGS. 11A and 11B illustrate variations in the rotational angle (180°~−180°) depending on time (t).

Referring now to FIG. 9, in operation 901, the electronic device (e.g., the electronic device 101, 201, or 400) may detect the motion data through the sensor module (e.g., the sensor module 460). For example, in the case where the processor 410 detects the selection 1002 for a "Star Exercise" button in the motion recognition service screen 1000 as shown in FIG. 10A, the processor 410 may collect sensor data through the sensor module 460. In this case, the processor 410 may convert the motion recognition module 412 into an active mode.

In operation 903, the electronic device may identify whether or not there is a motion pattern corresponding to the motion data among the motion patterns that are stored in the memory (e.g., the memory 420). For example, the motion recognition module 412 may detect a difference value between the waveform of the motion data detected through the sensor module 460 and the waveform of the motion pattern stored in the memory 420. The motion recognition module 412 may detect a motion pattern of which the difference value between the waveforms is less than a predetermined reference value as a motion pattern corresponding to the motion data.

In operation 905, if the electronic device fails to detect the motion pattern corresponding to the motion data, the electronic device may identify whether or not the motion data contains a repeated pattern. For example, if the motion recognition module 412 fails to detect the motion pattern corresponding to the motion data from the memory 420, the motion recognition module 412 may display a motion pattern list 1010 on the display 430 as shown in FIG. 10B. If the motion recognition module 412 detects the selection of a motion pattern addition menu (1012), the motion recognition module 412 may control the motion recognition management module 414 to create a motion pattern. The motion recognition management module 414 may identify whether or not the pattern of the motion data is repeated.

If the motion data does not contain the repeated pattern, the electronic device may recognize that the motion pattern cannot be created. For example, the motion recognition management module 414 may detect motion data on the rotational angle that is measured according to the user's motion (exercise), by using one or more sensors that are included in one or more electronic devices that the user wears through the sensor module 460 as shown in FIG. 11A. If a waveform 1102 of the motion data does not match the repeated pattern 1100, the motion recognition management module 414 may determine that the motion data does not contain the repeated pattern.

If the motion data contains the repeated pattern, the electronic device may extract at least one cycle of a pattern of the motion data in operation 907. For example, if the waveform 1112 of the motion data matches the repeated pattern 1110 as shown in FIG. 11B, the motion recognition management module 414 may determine that the motion data contains the repeated pattern. The motion recognition management module 414 may extract at least one cycle of a pattern 1114 from the repeated pattern of the motion data.

In operation 909, the electronic device may extract the features of the motion data from at least one cycle of a pattern. For example, the motion recognition management module 414 may extract the features of the motion data (e.g., average, dispersion, cycle, a peak value of a waveform, and/or an absolute value, dispersion, distance, and the amount of change of a valley value, and/or distance, or the like), which are contained in at least one cycle of a pattern.

In operation 911, the electronic device may create a motion pattern based on the features of the motion data for at least one cycle of a period. For example, the motion recognition management module 414 may make a request to a server for the motion pattern corresponding to the motion data. When a motion pattern named "curl exercise" is received in response to the motion pattern request, the motion recognition management module 414 display the information stating that a motion pattern of "curl exercise" is to be created on the display 430 as shown in FIG. 10C (1020). For example, the motion recognition management module 414 may display a name input screen 1030 of the motion pattern that corresponds to the motion data through the display 430. The motion recognition management module 414 may create the motion pattern of the name (e.g., "curl exercise"), which is input through the name input screen 1030 as shown in FIG. 10D. The motion recognition management module 414 may add an icon 1042 corresponding to the motion pattern of "curl exercise" to the motion pattern list 1010 as shown in FIG. 10E (1040).

When the electronic device detects the motion pattern corresponding to the motion data, the electronic device may collect motion execution information on the motion pattern in operation 913. For example, when the electronic device detects a motion pattern of arm-swinging during a run, the electronic device may estimate the number of steps to be double the number of arm-swings to then be displayed on the display 430.

According to various embodiments of the present disclosure, if there are a plurality of motion patterns corresponding to the motion data, the electronic device may display information on the plurality of motion patterns on the display 430. The electronic device may select one of the plurality of motion patterns displayed on the display 430 based on the input information of the input module 440 by the user.

Figure 12:
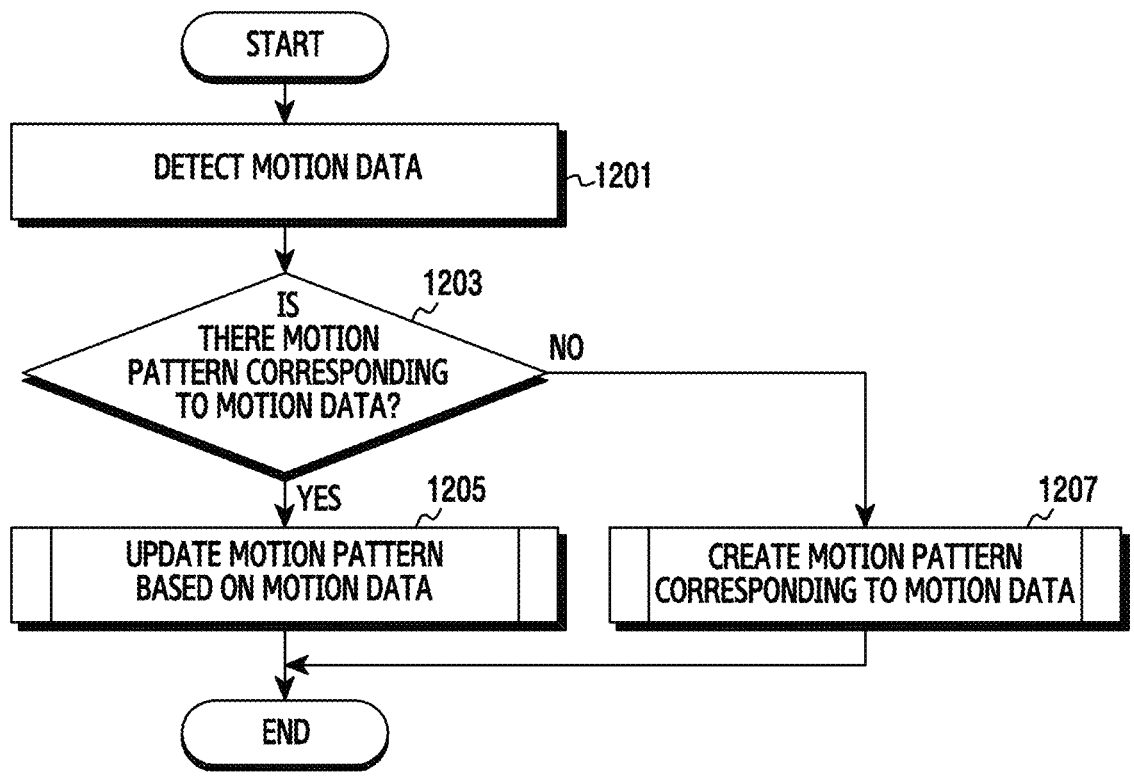
FIG. 12 is a flowchart illustrating operations for updating a motion pattern in the electronic device, according to various embodiments of the present disclosure.

FIG. 12 is a flowchart illustrating operations for updating a motion pattern in the electronic device, according to various embodiments of the present disclosure. The following description will be made of the operation for updating the motion pattern by using the screen configuration shown in FIG. 13.

Referring now to FIG. 12, in operation 1201, the electronic device (e.g., the electronic device 101, 201, or 400) detects the motion data through one or more sensors (e.g., an accelerometer, a gyro sensor, a geomagnetic sensor, or the like). For example, when the processor 410 detects the selection 1302 for a "Star Exercise" button in a motion recognition service screen 1300 as shown in FIG. 13A, the processor 410 may collect sensor data through one or more sensors.

In operation 1203, the electronic device may identify whether or not there is a motion pattern that corresponds, at least in part, to the motion data, among the motion patterns that are stored in the memory (e.g., the memory 420). For example, the motion recognition module 412 may identify whether or not a waveform of the motion data detected through the sensor module 460 is contained, at least in part, in the recognition range of the waveform of the motion pattern stored in the memory 420.

If the electronic device detects a motion pattern that corresponds, at least in part, to the motion data, the electronic device may update the motion pattern based on the motion data corresponding to the motion pattern in operation 1205. For example, if the motion recognition management module 414 detects a motion pattern corresponding to the motion data, the motion recognition management module 414 may display a message 1310 to suggest the update of a motion pattern "Exercise 1" on the display 430 as shown in FIG. 13B. For example, if the motion recognition management module 414 detects a motion pattern corresponding to the motion data, the motion recognition management module 414 may display a message 1320 to suggest the update of a motion pattern corresponding to the motion data on the display 430 as shown in FIG. 13C. When an input of an "OK" button is detected in FIG. 13B or 13C (1312 or 1322), the motion recognition management module 414 may update the recognition range of the motion pattern or the pattern structure of the motion pattern to correspond to the motion data detected in operation 1201. In one embodiment of the present disclosure, the motion recognition management module 414 may update the recognition range of the motion pattern or the pattern structure of the motion pattern to correspond to one or more pieces of motion data (including the motion data detected in operation 1201), which corresponds to the motion pattern stored in the memory 420.

If a motion pattern corresponding to the motion data is not detected, the electronic device may create a motion pattern corresponding to the motion data in operation 1207. For example, the motion recognition management module 414 may create a new motion pattern based on the features of the motion data contained in one cycle of a pattern as operation 905 to operation 911 of FIG. 9.

As described above, the electronic device may update the motion pattern to correspond to the motion data in order to thereby optimize the recognition range of a specific motion to correspond to a change in the exercise posture of the user.

According to various embodiments of the present disclosure, the electronic device may update the motion pattern based on the sensor data detected through the sensor module and one or more pieces of log data corresponding to the sensor data. Here, the log data may include the motion data that is pre-stored in the memory.

Figure 14:
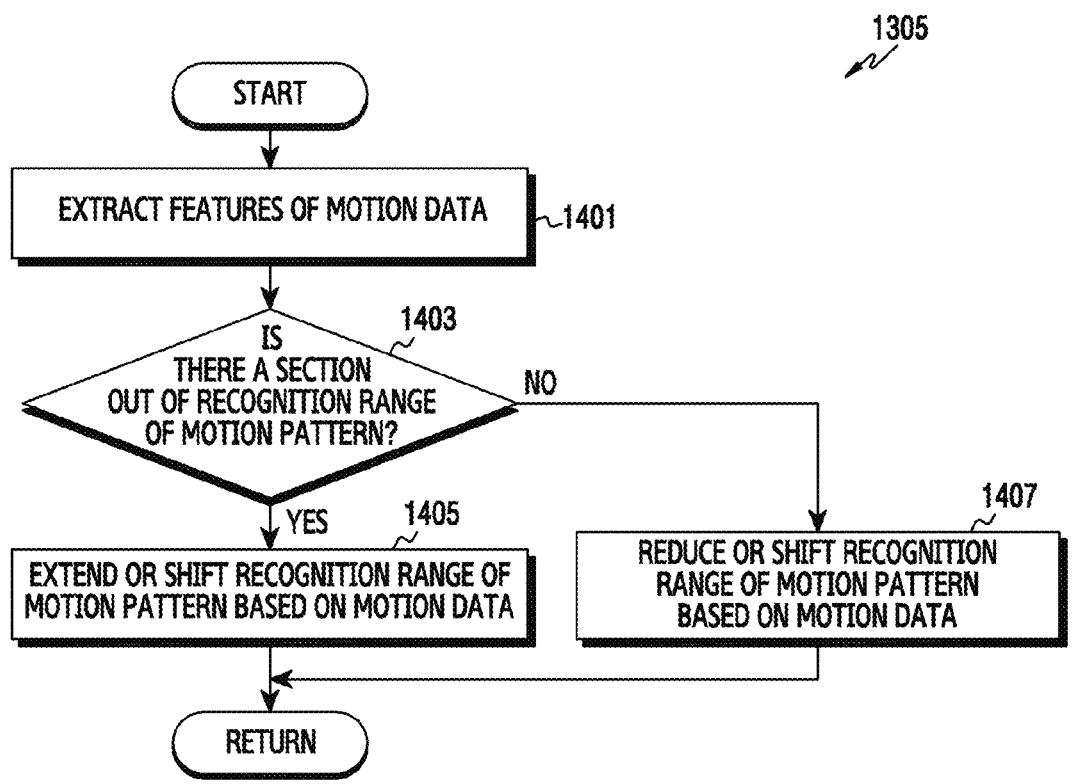
FIG. 14 is a flowchart illustrating operations for updating a recognition range of the motion pattern in the electronic device, according to various embodiments of the present disclosure.

FIG. 14 is a flowchart illustrating operations for updating the recognition range of the motion pattern in the electronic device, according to various embodiments of the present disclosure. The following description will be made of the operation for updating the motion pattern in operation 1205 of FIG. 12 by using the waveform of the motion data shown in FIG. 15 and FIG. 16. Here, FIG. 15A, FIG. 15B, FIG. 16A and FIG. 16B illustrate a variation in the rotational angle (180°~−180°) depending on time (t).

Referring now to FIG. 14, in operation 1401, the electronic device (e.g., the electronic device 101, 201, or 400) may extract the features of the motion data. For example, the motion recognition management module 414 may extract the features of the motion data contained in one cycle of a pattern as operation 905 to operation 909 of FIG. 9.

In operation 1403, the electronic device may identify whether or not there is a section in which the waveform of the motion data is out of the recognition range of the motion pattern.

Figure 15A:
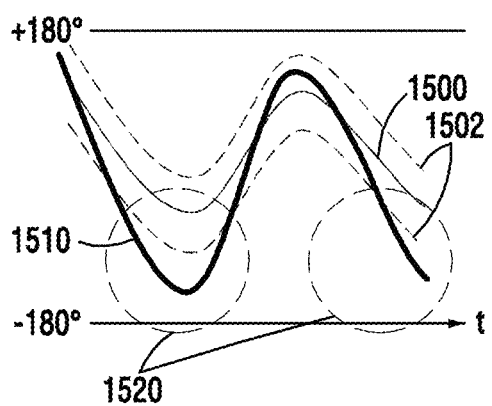
FIG. 15A and FIG. 15B illustrate waveforms for extending a recognition range of the motion pattern, according to various embodiments of the present disclosure.
Figure 15B:
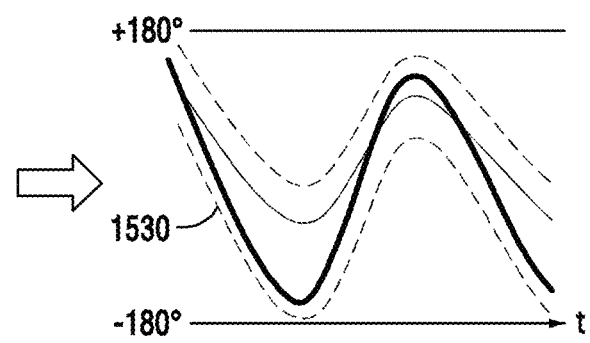

If there is a section in which the waveform of the motion data is out of the recognition range of the motion pattern, the electronic device may extend or shift at least some sections of the recognition range of motion pattern based on the waveform of the motion data in operation 1405. For example, the motion recognition management module 414 may detect motion data of the rotational angle of the user through the sensor module 460 as shown in diagram (a) of FIG. 15. If there is a section 1520 in which the waveform 1510 of the motion data is out of the recognition range 1502 of the motion pattern 1500, the motion recognition management module 414 may extend the recognition range 1502 of the section 1520, which is out of the range, such that the waveform 1510 of the motion data is contained in the recognition range 1502 of the motion pattern 1500 as shown in FIG. 15B (1530).

Figures 16A, 16B:
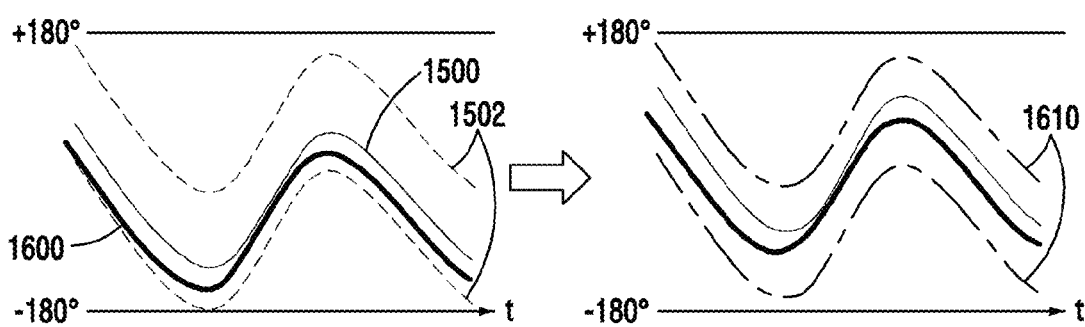
FIG. 16A and FIG. 16B illustrate waveforms for shifting or reducing a recognition range of the motion pattern, according to various embodiments of the present disclosure.

In operation 1407, if there is no section in which the waveform of the motion data is out of the recognition range of the motion pattern, the electronic device may reduce or shift the recognition range of the motion pattern based on the waveform of the motion data. For example, the motion recognition management module 414 may detect the motion data of the rotational angle of the user through the sensor module 460 as shown in FIG. 16A. If the waveform 1600 of the motion data does not depart from the recognition range 1502 of the motion pattern 1500, the motion recognition management module 414 may shift (or reduce) the recognition range 1502 such that the waveform 1600 of the motion data is positioned in the center of the recognition range 1502 of the motion pattern 1500 as shown in FIG. 16B (1610).

According to an embodiment of the present disclosure, if the waveform of the motion data is adjacent, at least in part, to the waveform of the motion pattern, the electronic device may reduce or shift the recognition range of the motion pattern based on the waveform of the motion data. For example, the electronic device may recognize, as a section where the waveform of the motion data is adjacent to the waveform of the motion pattern, the section where a difference value between the waveform of the motion data and the waveform and the motion pattern is less than a predetermined reference difference value.

Figure 17:
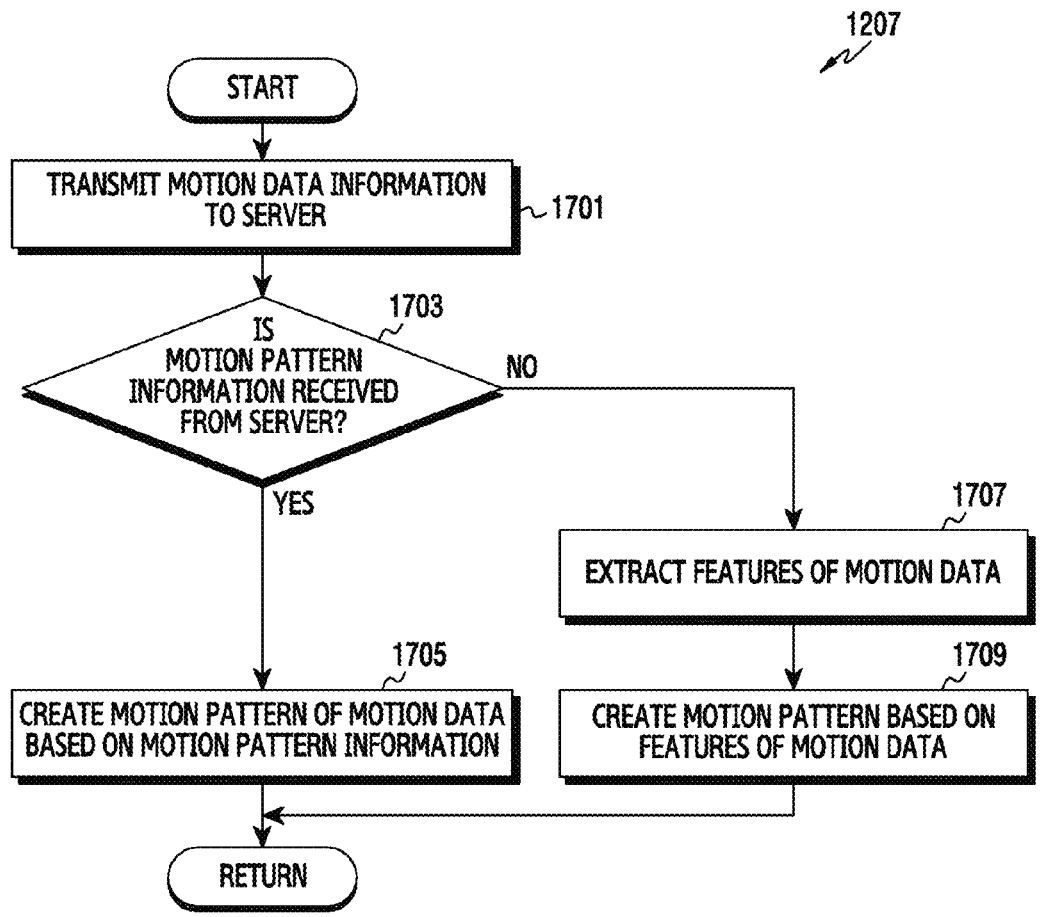
FIG. 17 is a flowchart illustrating operations for creating a motion pattern through a server in the electronic device, according to various embodiments of the present disclosure.

FIG. 17 is a flowchart illustrating operations for creating a motion pattern through the server in the electronic device, according to various embodiments of the present disclosure. The following description will be made of the operation for creating the motion pattern corresponding to the motion data in operation 1207 of FIG. 12.

Referring now to FIG. 17, in operation 1701, the electronic device (e.g., the electronic device 101, 201, or 400) may transmit the motion data (the motion data detected in operation 1201) to the server. For example, the motion recognition management module 414 may transmit the motion data that is detected through the sensor module 460 to the server through the communication module 450.

In operation 1703, the electronic device may identify whether or not motion pattern information is received from the server.

If the motion pattern information corresponding to the motion data is received from the server, the electronic device may create a motion pattern of the motion data based on the motion pattern information in operation 1705. For example, if the motion pattern information corresponding to the motion data is received from the server, the electronic device may configure the received motion pattern to be the motion pattern of the motion data. For example, when the name of the motion pattern corresponding to the motion data is received from the server, the electronic device may create a motion pattern in the name received from the server based on the attributes of the motion data.

If the motion pattern information corresponding to the motion data is not received from the server, the electronic device may extract the attributes of the motion data in operation 1707. For example, if motion pattern-unrecognized information is received from the server, the motion recognition management module 414 may extract the features of the motion data contained in one cycle of a pattern as operation 905 to operation 909 of FIG. 9.

In operation 1709, the electronic device may create a motion pattern based on the features of the motion data. For example, the motion recognition management module 414 may create a new motion pattern based on the features of the motion data contained in one cycle of a pattern, which is extracted in operation 1707.

Figure 18:
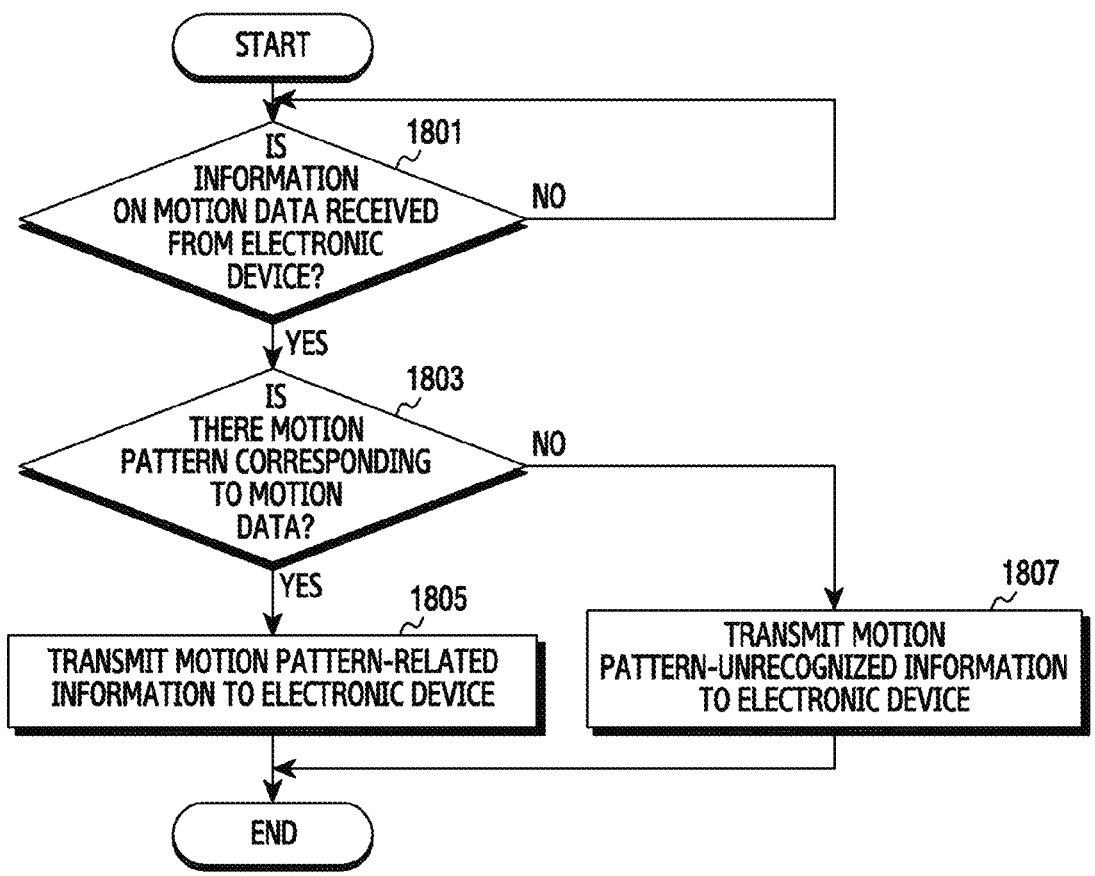
FIG. 18 is a flowchart illustrating operations for detecting a motion pattern in a server, according to various embodiments of the present disclosure.

FIG. 18 is a flowchart illustrating operations for detecting a motion pattern in the server, according to various embodiments of the present disclosure. The following description will be made of the operation of the server, which corresponds to the operation of the electronic device of FIG. 17.

Referring now to FIG. 18, in operation 1801, the server may identify whether or not the motion data information is received from the electronic device.

If the motion data information is received from the electronic device, the server may identify whether or not there is a motion pattern corresponding to the motion data among the motion patterns stored in the server in operation 1803. For example, the server may compare the waveform of each motion pattern that is pre-stored with the waveform of the motion data in order to thereby identify whether or not there is a motion pattern corresponding to the motion data.

If the motion pattern corresponding to the motion data is detected, the server may transmit the information on the corresponding motion pattern to the electronic device in operation 1805. For example, the server may transfer the motion pattern corresponding to the motion data to the electronic device. For example, the server may transmit the name of the motion pattern corresponding to the motion data to the electronic device.

If the motion pattern corresponding to the motion data is not detected, the server may transmit the motion pattern-unrecognized information to the electronic device in operation 1807.

Figure 19:
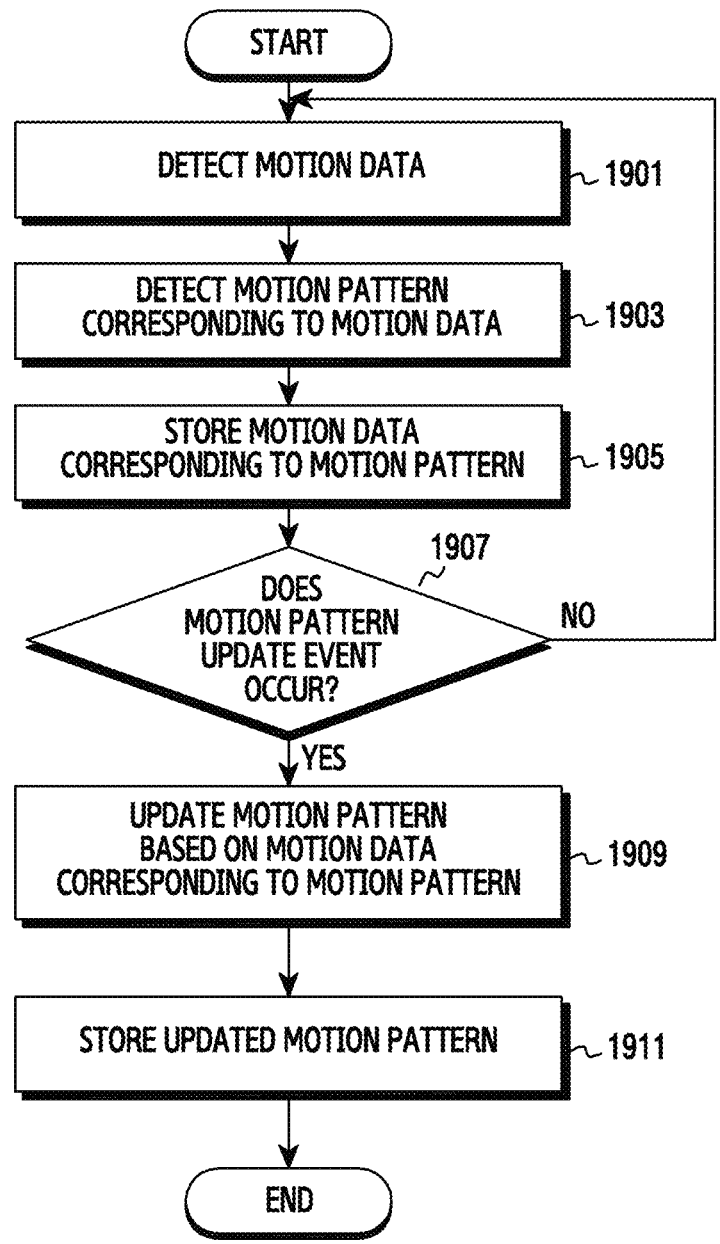
FIG. 19 is a flowchart illustrating operations for updating a motion pattern in the electronic device, according to various embodiments of the present disclosure.

FIG. 19 is a flowchart illustrating operations for updating a motion pattern in the electronic device, according to various embodiments of the present disclosure.

Referring now to FIG. 19, in operation 1901, the electronic device (e.g., the electronic device 101, 201, or 400) may detect motion data through the sensor module (e.g., the sensor module 460).

In operation 1903, the electronic device may detect a motion pattern corresponding to the motion data among the motion patterns stored in the memory (e.g., the memory 420). For example, the motion recognition module 412 may compare the waveform of the motion data detected through the sensor module 460 with the waveform of each of the motion patterns stored in the memory 420 in order to thereby detect the motion pattern corresponding to the motion data.

In operation 1905, the electronic device may store the motion data corresponding to the motion pattern in the memory. In this case, the electronic device may collect motion execution information on the motion pattern.

In operation 1907, the electronic device may identify whether or not a motion pattern updating event occurs. For example, the electronic device may identify whether or not it is time to update the motion pattern according to the motion pattern update cycle.

If the motion pattern updating event does not occur, the electronic device may detect the motion data again in operation 1901.

If the motion pattern updating event occurs, the electronic device may update the motion pattern based on one or more pieces of motion data corresponding to the motion pattern (e.g., the motion pattern detected in operation 1903), which is stored in the memory, in operation 1909. For example, the motion recognition management module 414 may update (e.g., extend, reduce, or shift) the recognition range of the corresponding motion pattern based on one or more pieces of motion data corresponding to the motion pattern (e.g., the motion pattern detected in operation 1903) among the motion data stored in the memory. For example, the motion recognition management module 414 may transform the pattern structure of the corresponding motion pattern based on one or more pieces of motion data corresponding to the motion pattern (e.g., the motion pattern detected in operation 1903) among the motion data stored in the memory.

In operation 1911, the electronic device may store the updated motion pattern information in the memory. For example, the motion recognition management module 414 may replace the motion pattern stored in the memory 420 by the update motion pattern. According to this aspect, the motion recognition module 412 may detect the motion pattern corresponding to the motion data by using the updated motion pattern information.

Figure 20:
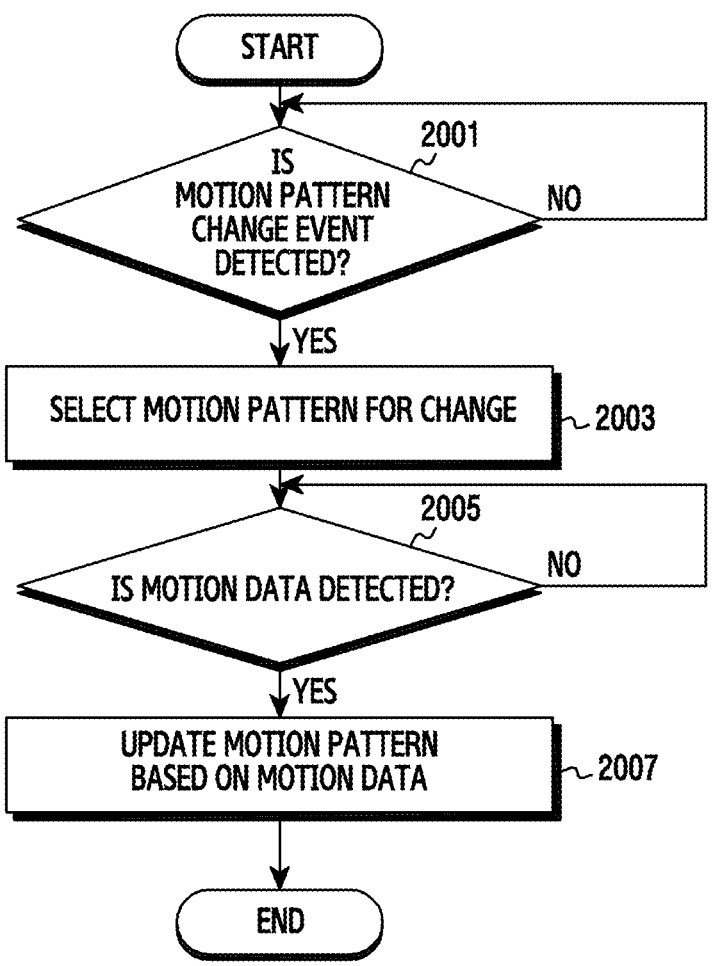
FIG. 20 is a flowchart illustrating operations for updating the pattern structure of a motion pattern in the electronic device, according to various embodiments of the present disclosure.
Figure 21A:
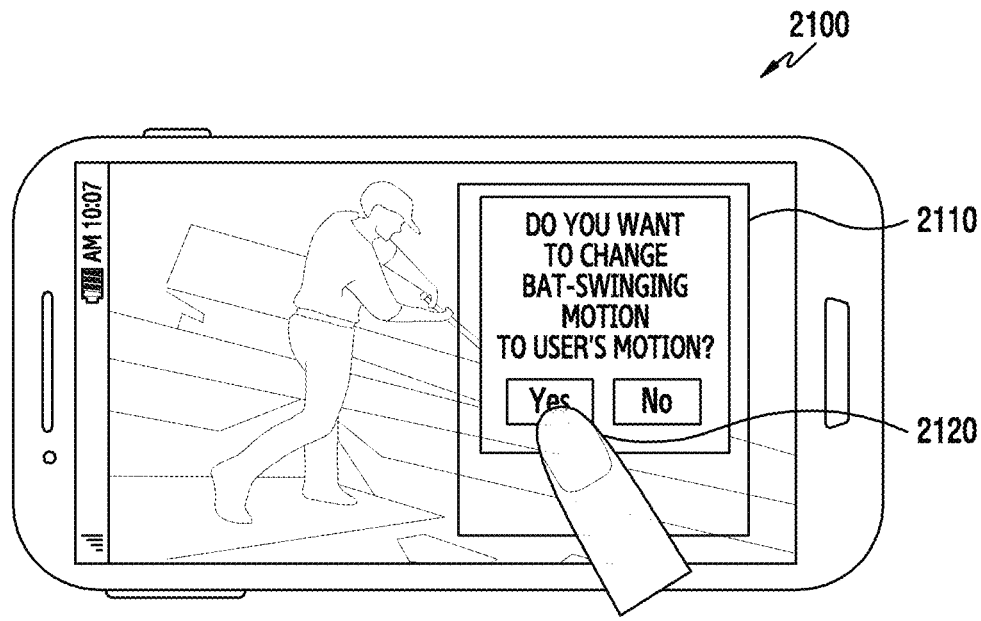
FIG. 21A and FIG. 21B illustrate screen configurations for updating the pattern structure of a motion pattern, according to various embodiments of the present disclosure.

FIG. 20 is a flowchart illustrating operations for updating the pattern structure of a motion pattern in the electronic device, according to various embodiments of the present disclosure. The following description will be made of the operation of changing the pattern structure of the motion pattern by using the screen configuration shown in FIG. 21.

Referring to FIG. 20, in operation 2001, the electronic device (e.g., the electronic device 101, 201, or 400) may identify whether or not a motion pattern change event is detected. For example, the motion recognition management module 414 may identify whether or not a motion pattern change menu is selected by the input information of the input module 440. For example, the motion recognition management module 414 may identify whether or not a gesture corresponding to the motion pattern change event is detected.

In operation 2003, if the motion pattern change event is detected, the electronic device may select a motion pattern to be changed from among the motion patterns that are stored in the memory (e.g., the memory 420). For example, the motion recognition management module 414 may display, on the display 430, a list of the motion patterns, which can be changed, among the motion patterns stored in the memory 420. If a motion pattern (e.g., a bat-swinging motion) for the game control is selected from the motion pattern list, the motion recognition management module 414 may display motion pattern information for the game control on the display 430 as shown in diagram (a) of FIG. 21 (2100). Additionally, the motion recognition management module 414 may display, on the display 430, a menu 2110 to check whether or not the motion pattern is to be changed for the game control. If an input of a "yes" button is detected in the menu 2110 for identifying the change of the motion pattern (2120), the motion recognition management module 414 may determine that the corresponding motion pattern is to be changed.

In operation 2005, the electronic device may identify whether or not the motion data is detected. For example, when the motion pattern to be changed is selected, the motion recognition management module 414 may transmit a motion data request signal to one or more wearable devices that interwork with the electronic device 400. The motion recognition management module 414 may identify whether or not the motion data is received from one or more wearable devices. Here, one or more wearable devices that interwork with the electronic device 400 may include one or more wearable devices that are connected with the electronic device 400 for communication.

If the motion data is not detected, the electronic device may identify whether or not the motion data is detected again in operation 2005. For example, if the motion data is not detected until a predetermined reference time expires from the time when the motion pattern to be changed is selected, the motion recognition management module 414 may determine that the motion pattern change is unsuccessful. Here, the reference time may indicate predetermined time information to determine the success or failure of the motion pattern change.

Figure 21B:
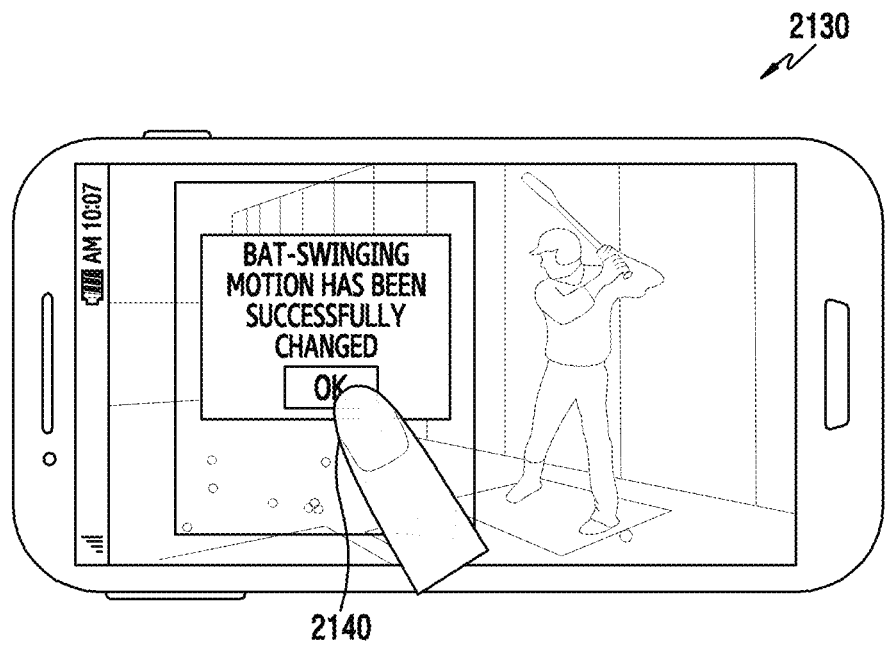

If the motion data is detected, the electronic device may change the pattern structure of the motion pattern based on the motion data in operation 2007. For example, the motion recognition management module 414 may extract the features of the motion data. The motion recognition management module 414 may change the pattern structure of the motion pattern based on the features of the motion data. If the motion recognition management module 414 changes the pattern structure of the motion pattern, the motion recognition management module 414 may display a change-completed screen 2130 of the motion pattern (e.g., a bat-swing motion) on the display 430 as shown in FIG. 21B. Additionally, the motion recognition management module 414 may display a change completion message 2140 of the motion pattern on the display 430. If an input of an "OK" button is detected in the change completion message 2140 of the motion pattern (2142), the motion recognition management module 414 may determine that the change of the corresponding motion pattern has been completed.

Figure 22:
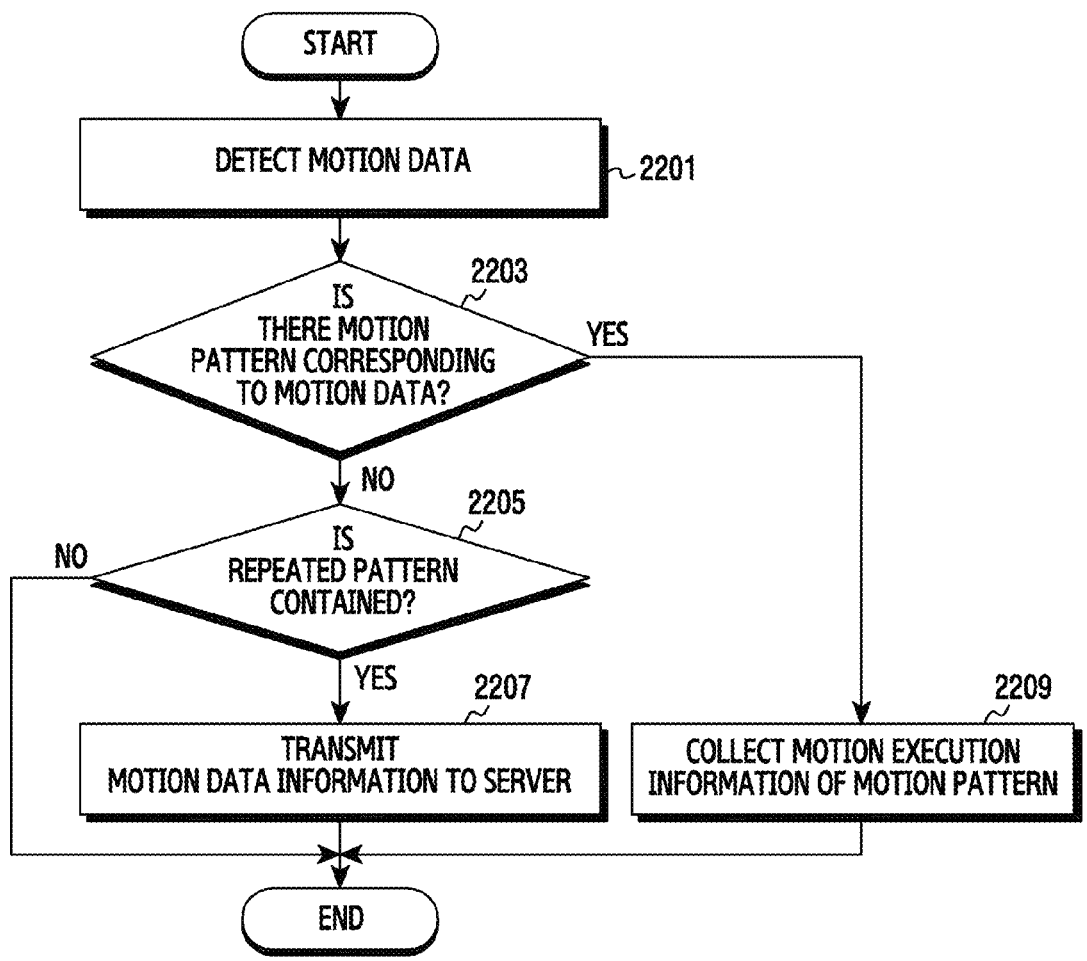
FIG. 22 shows a flowchart illustrating operations for transmitting motion data from the electronic device to the server, according to various embodiments of the present disclosure.

FIG. 22 shows a flowchart illustrating operations for transmitting motion data from the electronic device to the server, according to various embodiments of the present disclosure. The following description will be made of an operating method of the electronic device for creating or updating a general motion pattern through the server.

Referring now to FIG. 22, in operation 2201, the electronic device (e.g., the electronic device 101, 201, or 400) may detect the motion data through one or more sensors.

In operation 2203, the electronic device may identify whether or not there is a motion pattern corresponding to the motion data. For example, the processor 410 may identify whether or not there is a motion pattern corresponding to the waveform of the motion data among a plurality of motion patterns that are stored in the memory 420.

If there is no motion pattern corresponding to the motion data, the electronic device may identify whether or not the motion data contains a repeated pattern in operation 2205.

If the motion data contains a repeated pattern, the electronic device may transmit the motion data (the motion data detected in operation 2201) to the server in operation 2207. For example, if the motion data contains a repeated pattern, the motion recognition management module 414 may determine that the motion pattern corresponding to the corresponding motion data can be created. According to this aspect, the motion recognition management module 414 may control the communication module 450 to transmit the motion data to the server.

If there are one or more motion patterns corresponding to the motion data, the electronic device may collect motion execution information on the motion pattern in operation 2209. For example, if there are a plurality of motion patterns corresponding to the motion data, the motion recognition module 412 may display a motion pattern list corresponding to the motion data on the display 430. The electronic device may select one motion pattern from the motion pattern list based on the input information of the input module 440. For example, in the case of a plurality of motion patterns corresponding to the motion data, the motion recognition module 412 may select a motion pattern that is most similar to the waveform of the motion data among the plurality of motion patterns.

Figure 23:
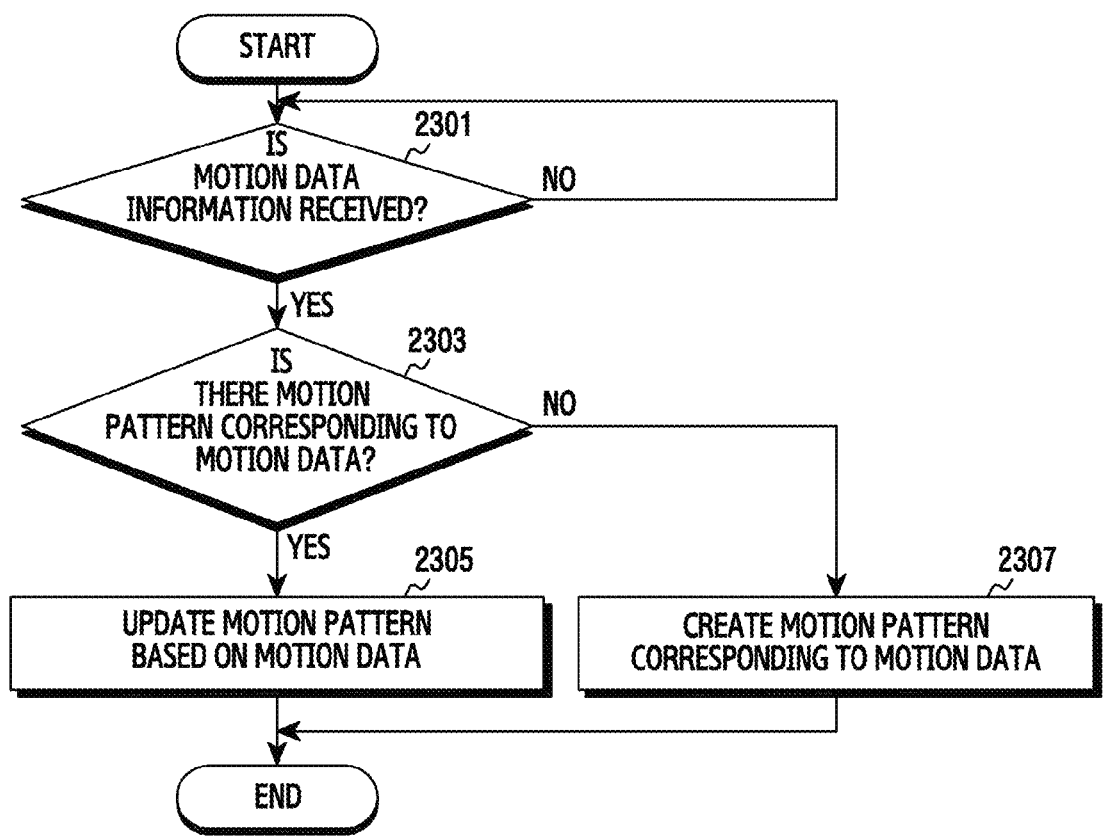
FIG. 23 is a flowchart illustrating operations of creating a motion pattern based the motion data of at least one electronic device in the server, according to various embodiments of the present disclosure.

FIG. 23 is a flowchart illustrating operations of creating a motion pattern based on the motion data of at least one electronic device in the server, according to various embodiments of the present disclosure. The following description will be made of the operation of the server to create or update the motion pattern in response to the operation of the electronic device in FIG. 22.

Referring to FIG. 23, in operation 2301, the server may identify whether or not the motion data information is received from the electronic device.

In operation 2303, if the motion data information is received from the electronic device, the server may identify whether or not there is a motion pattern corresponding to the motion data among the motion patterns stored in the server.

If a motion pattern corresponding to the motion data is detected, the server may update the motion pattern based on the motion data in operation 2305. For example, the server may extract one cycle of a pattern of the motion data. The server may update the recognition range of the motion pattern based on the features of the motion data, which is contained in one cycle of a pattern.

If a motion pattern corresponding to the motion data is not detected, the server may create a motion pattern corresponding to the motion data in operation 2307. For example, the server may extract one cycle of a pattern of the motion data. The server may create a new motion pattern based on the features of the motion data, which is contained in one cycle of a pattern.

Figure 24:
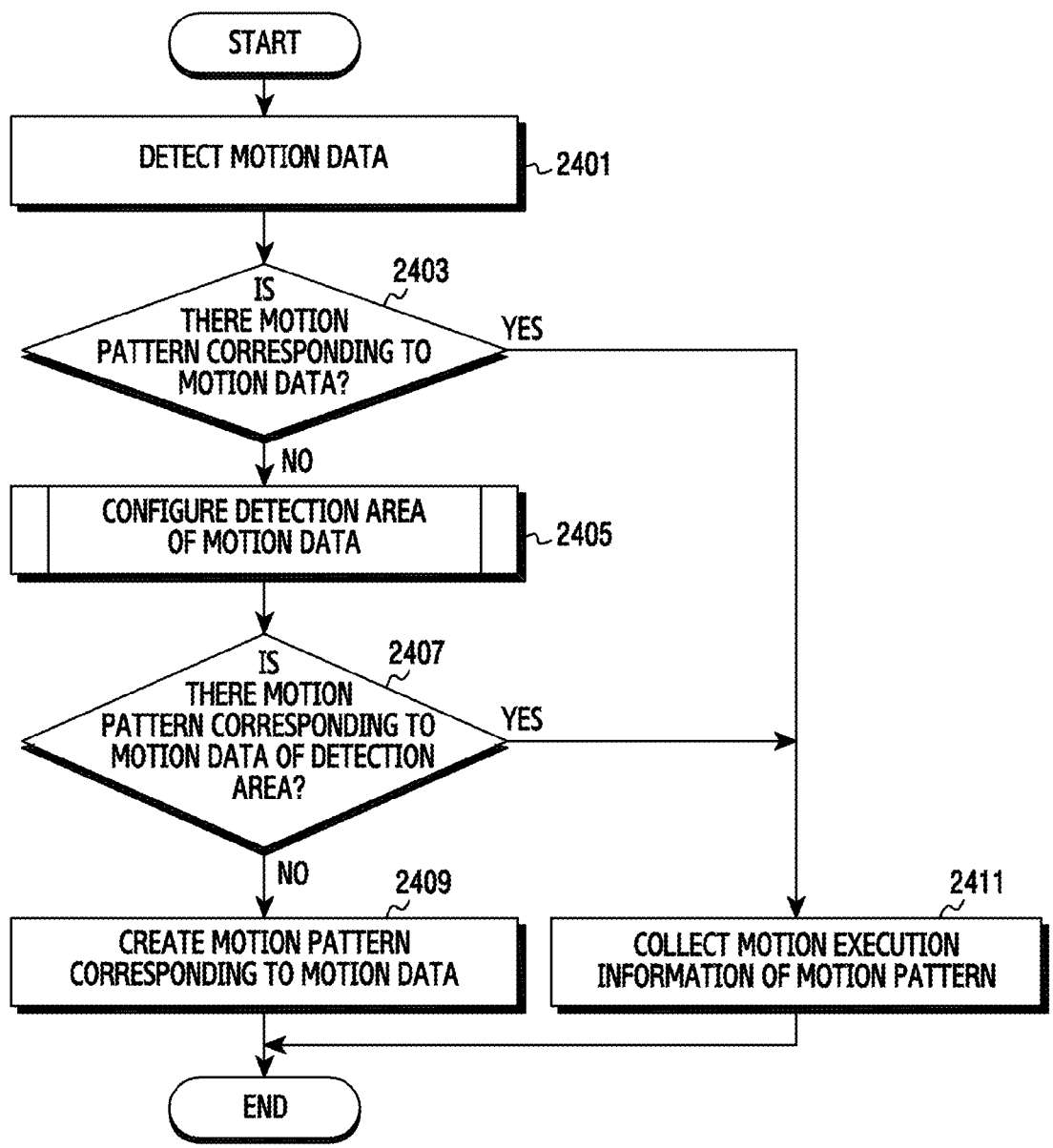
FIG. 24 is a flowchart illustrating operations for configuring a detection area of motion data in the electronic device, according to various embodiments of the present disclosure.

FIG. 24 is a flowchart illustrating operations for configuring a detection area of the motion data in the electronic device, according to various embodiments of the present disclosure.

Referring now to FIG. 24, in operation 2401, the electronic device (e.g., the electronic device 101, 201, or 400) may detect motion data (e.g., sensor data) through the sensor module (e.g., the sensor module 460).

In operation 2403, the electronic device may retrieve the memory (e.g., the memory 420) in order to thereby identify whether or not a motion pattern corresponding to the motion data is detected.

If a motion pattern corresponding to the motion data is not detected, the electronic device may configure a detection area of the motion data in operation 2405. For example, the motion recognition module 412 may display the waveform of the motion data on the display 430. The motion recognition module 412 may configure a detection area of the motion data based on the input information corresponding to the waveform of the motion data displayed on the display 430. Here, the detection area of the motion data may represent a range that contains at least a partial waveform that is compared with the motion pattern or is intended to create the motion pattern among the entire waveform of the motion data.

In operation 2407, the electronic device may identify whether or not there is a motion pattern corresponding to the motion data contained in the detection area among the motion patterns stored in the memory.

If there is no motion pattern corresponding to the motion data contained in the detection area, the electronic device may create a motion pattern corresponding to the motion data contained in the detection area in operation 2409. For example, the motion recognition management module 414 may create a new motion pattern based on the features of the motion data contained in the detection area.

If the motion pattern corresponding to the motion data is detected, the electronic device may collect the motion execution information for the corresponding motion pattern in operation 2411. For example, the motion recognition module 412 may collect the motion execution information of the motion pattern corresponding to the motion data.

Figure 25:
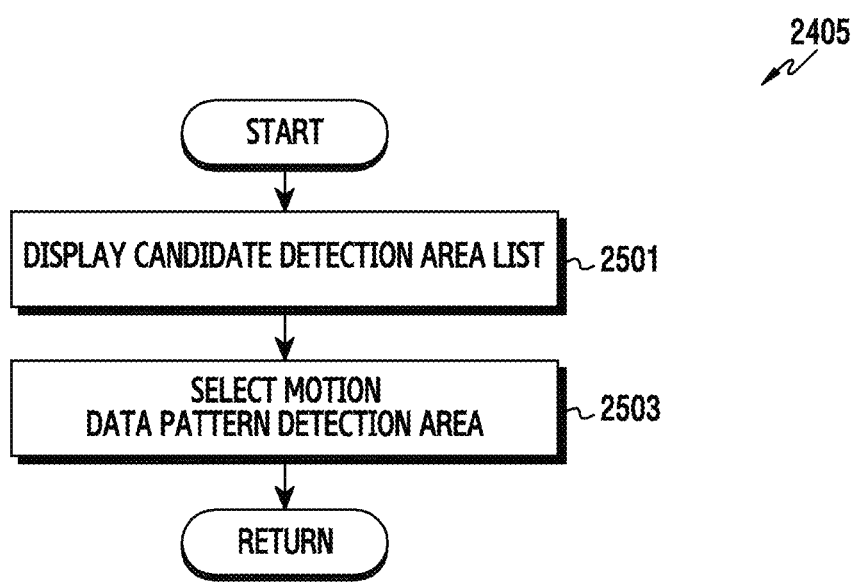
FIG. 25 is a flowchart illustrating operations for providing candidate detection area information in the electronic device, according to various embodiments of the present disclosure.

FIG. 25 is a flowchart illustrating operations for providing candidate detection area information in the electronic device, according to various embodiments of the present disclosure. The following description will be made of the operation for configuring the detection area of the motion data in operation 2405 of FIG. 24.

Referring to FIG. 25, in operation 2501, the electronic device (e.g., the electronic device 101, 201, or 400) may display candidate detection area information on the waveform of the motion data. For example, the motion recognition module 412 may divide the waveform of the motion data into a plurality of sections, and may display each section as a candidate detection area.

In operation 2503, the electronic device may select one or more candidate search areas as detection areas of the motion data from among the displayed candidate detection area information. For example, the motion recognition module 412 may select, as the detection area of the motion data, one or more candidate detection areas that are selected by the input information that is detected through the input module 440 from among the candidate detection area information displayed on the displayed 430.

Figure 26:
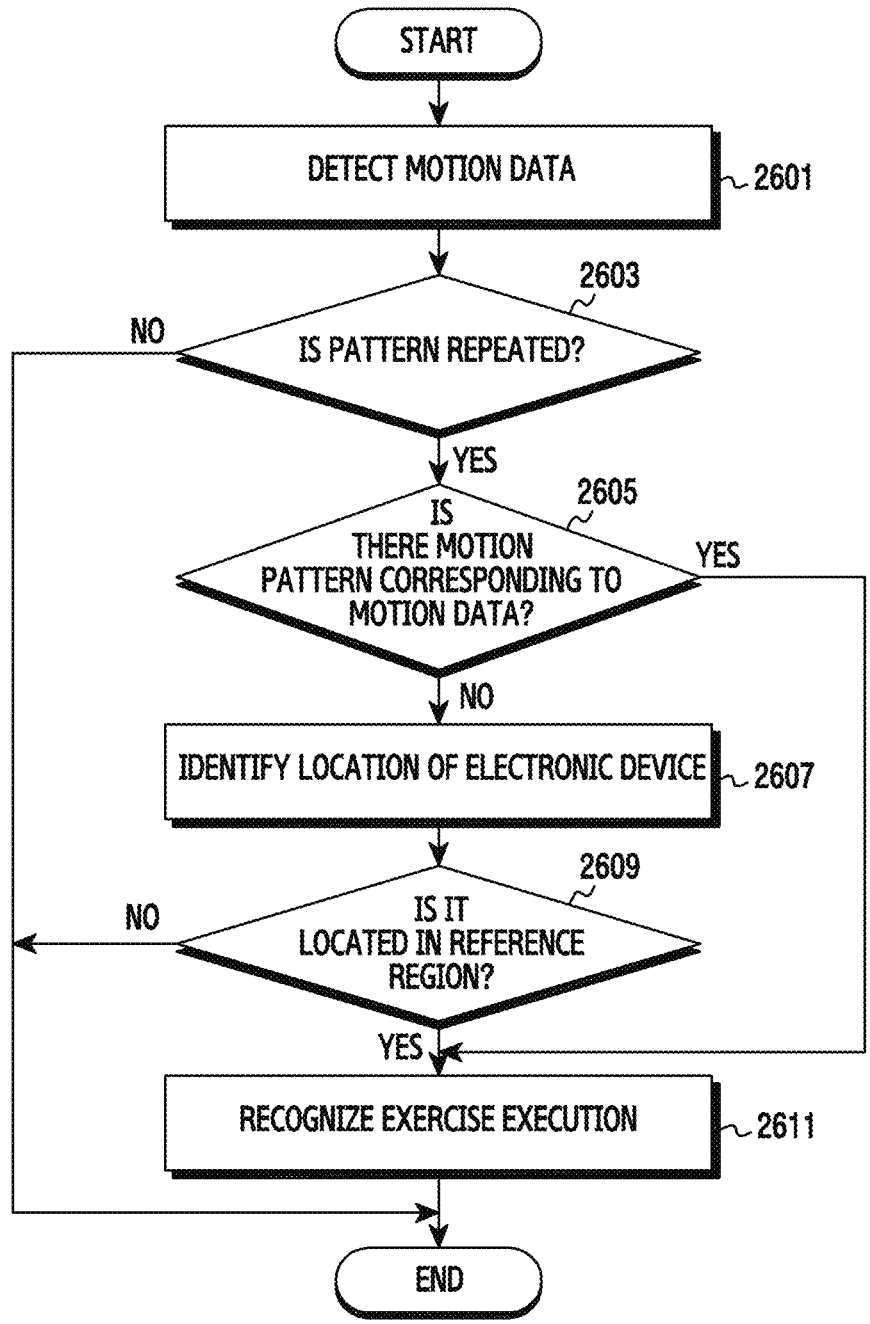
FIG. 26 is a flowchart illustrating operations for determining whether or not the exercise is to be performed in the electronic device, according to various embodiments of the present disclosure.

FIG. 26 is a flowchart illustrating operations for determining whether or not the exercise is to be performed in the electronic device, according to various embodiments of the present disclosure.

Referring to FIG. 26, in operation 2601, the electronic device (e.g., the electronic device 101, 201, or 400) may detect the motion data. For example, the processor 410 may detect sensor data through the sensor module 460 in response to a motion recognition start event.

In operation 2603, the electronic device may identify whether or not a pattern is repeated through the motion data.

For example, the processor 410 may compare the waveforms of the motion data that is detected for a reference time in order to thereby identify if a specific pattern is repeated.

If a pattern repeated through the motion data is detected, the electronic device may identify whether or not there is a motion pattern corresponding to the motion data in the memory (e.g., the memory 420) in operation 2605.

If there is no motion pattern corresponding to the motion data, the electronic device may identify the location of the electronic device in operation 2607. For example, the electronic device may estimate the location of the electronic device based on environment information, such as a GPS, a serving cell, WiFi, atmosphere pressure, geomagnetism, or the like.

In operation 2609, the electronic device may identify whether or not the electronic device is located in a reference region. Here, the reference region may include a predetermined region in which the user may take exercise, such as a gym, or a playground.

If there is a motion pattern corresponding to the motion data or if the electronic device is located in the reference region, the electronic device may recognize the exercise performance status of the user in operation 2611.

As described above, the repetition of a specific pattern is detected several times within a reference time regardless of the occurrence of the motion recognition start event, the electronic device may recognize the exercise performance status of the user.

Figure 27:
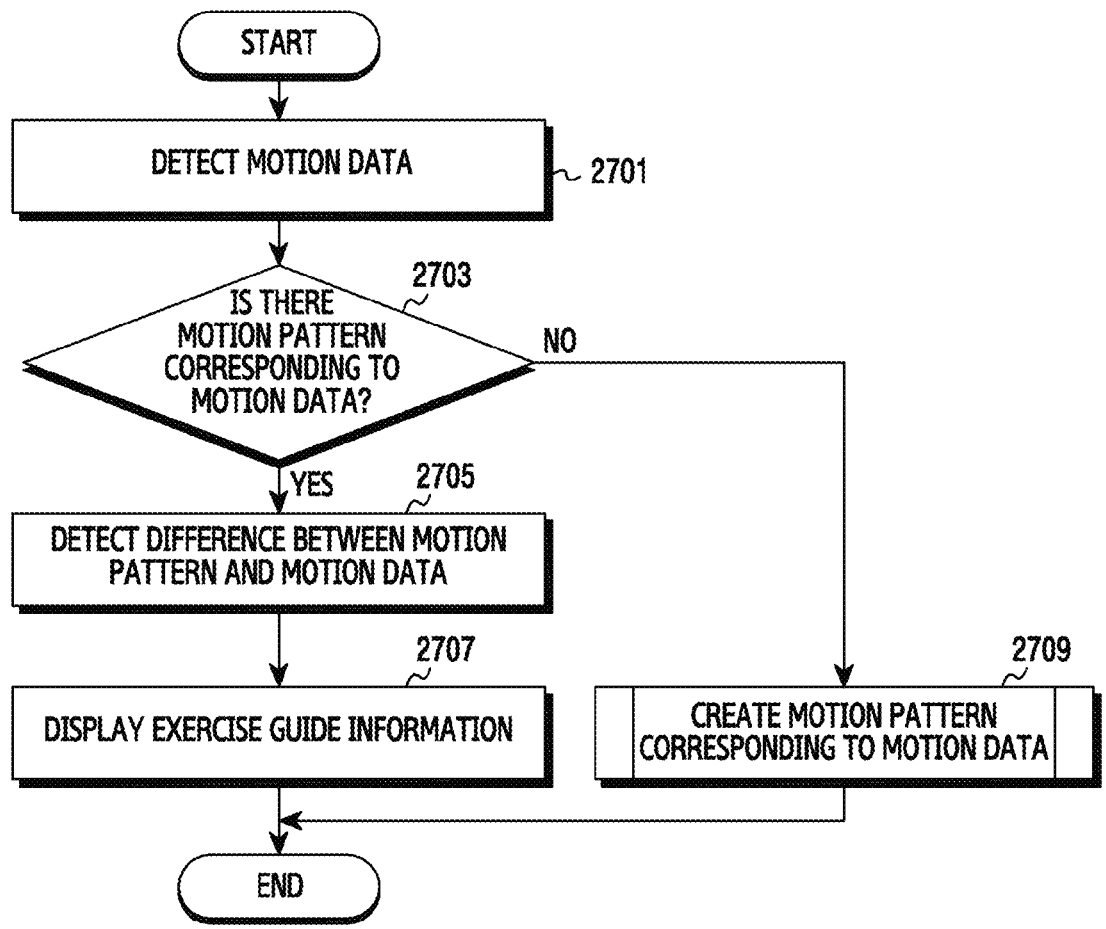
FIG. 27 is a flowchart illustrating operations for providing exercise guide information by the electronic device, according to various embodiments of the present disclosure.
Figure 28A:
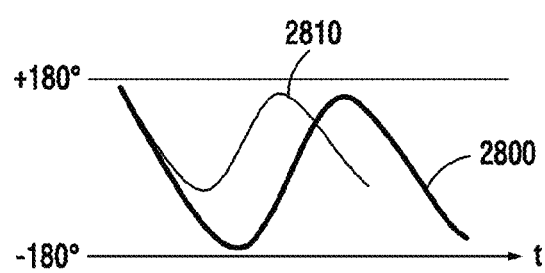
FIG. 28A and FIG. 28B illustrate a motion pattern and a screen configuration for providing exercise guide information, according to various embodiments of the present disclosure.

FIG. 27 is a flowchart illustrating operations for providing exercise guide information in the electronic device, according to various embodiments of the present disclosure. The following description will be made of the operation of providing exercise guide information by using the screen configuration shown in FIGS. 28A and 28B. Here, FIG. 28A shows a variation in the rotational angle (180°~–180°) depending on time (t).

Referring to FIG. 27, in operation 2701, the electronic device (e.g., the electronic device 101, 201 or 400) may detect motion data (sensor data) by using one or more sensors.

In operation 2703, the electronic device may identify whether or not motion pattern corresponding to the motion data is retrieved in the memory (e.g., the memory 420).

If the motion pattern corresponding to the motion data is retrieved, the electronic device may detect a difference value between the motion pattern and the motion data in operation 2705. For example, when a motion pattern 2800 corresponding to the motion data 2810 is detected as shown in FIG. 28A, the motion recognition module 412 may detect a difference value between the waveform of the motion data 2810 and the waveform of the motion pattern 2800. For example, the motion recognition module 412 may compare the motion data 2810 with the motion pattern 2800 in order to thereby obtain a difference value, such as the trajectory, the speed, the intensity, or the cycle thereof.

Figure 28B:
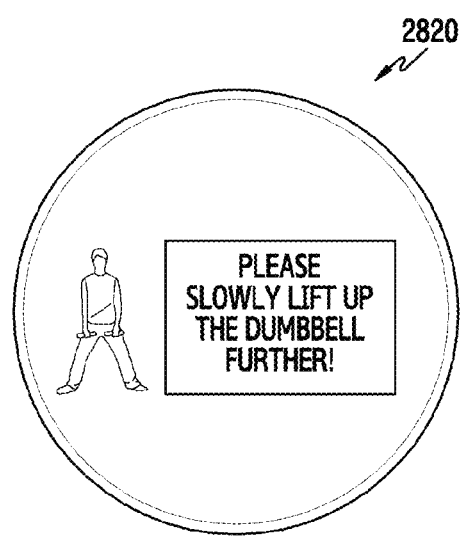

In operation 2707, the electronic device may provide exercise guide information based on the difference value between the motion data and the motion pattern. For example, if the cycle of the motion data is less than the motion pattern and the rotational angle is small as shown in FIG. 28A, the motion recognition module 412 may determine that the user's exercise speed is high and the motion posture is not correct. According to this aspect, the motion recognition module 412 may display a guide message (e.g., "Please slowly lift up the dumbbell further") 2820 on the display 430 as shown in FIG. 28B.

If the motion pattern corresponding to the motion data is not detected, the electronic device may create a new motion pattern corresponding to the motion data in operation 2709. For example, the motion recognition management module 414 may create the motion pattern corresponding to the motion data as operation 1701 to operation 1709.

Figure 29:
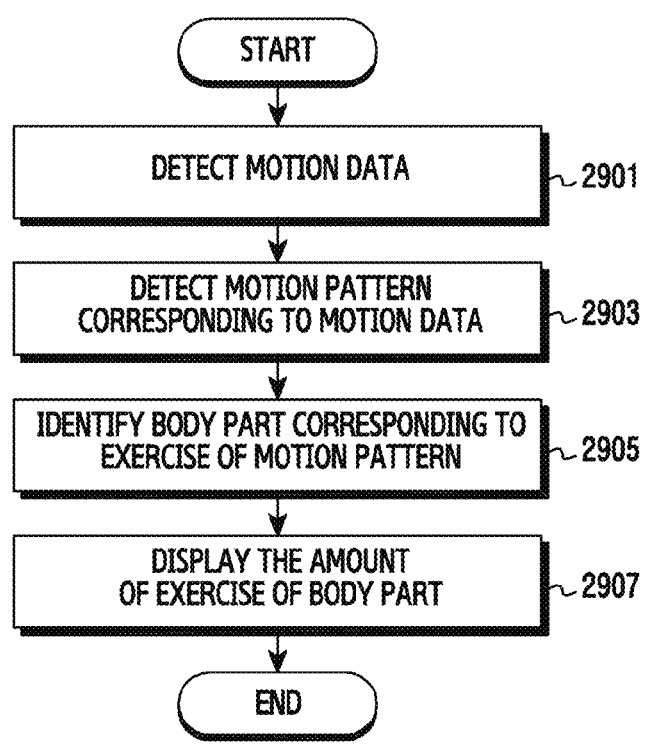
FIG. 29 is a flowchart illustrating operations to display the amount of exercise of a body part in the electronic device, according to various embodiments of the present disclosure.

FIG. 29 is a flowchart illustrating operations for displaying the amount of exercise of a body part in the electronic device, according to various embodiments of the present disclosure. The following description will be made of the operation for displaying the amount of exercise of a body part by using the screen configuration shown in FIG. 30.

Figure 30C:
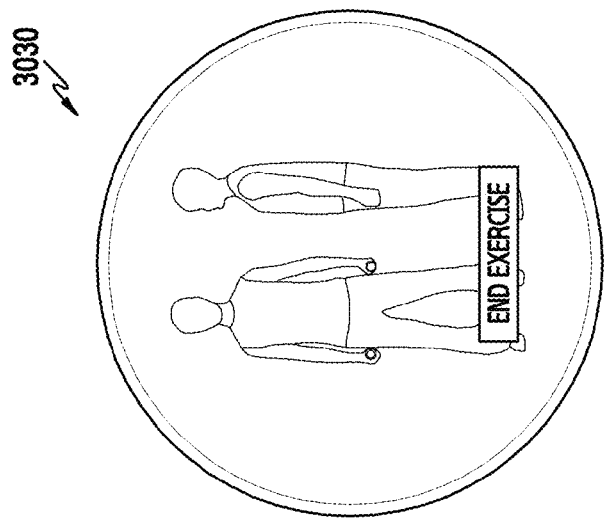
FIG. 30A, FIG. 30B, and FIG. 30C illustrate various screen configurations for displaying the amount of exercise of a body part, according to various embodiments of the present disclosure.
Figure 30B:
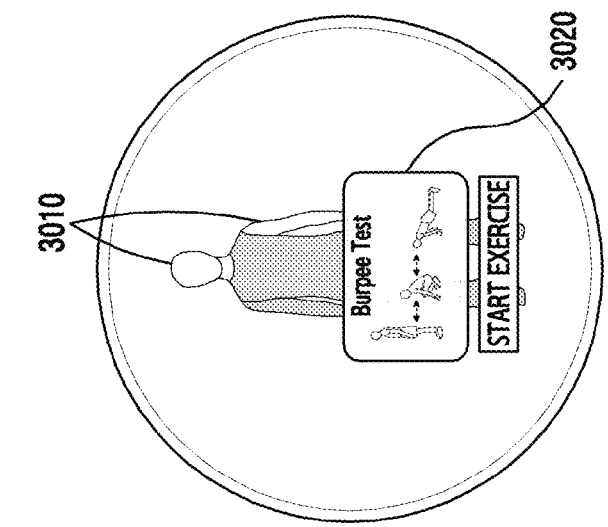
Figure 30A:
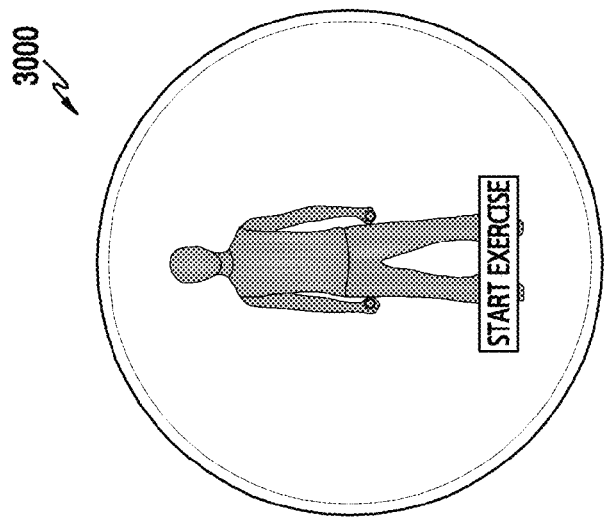

Referring now to FIG. 29, in operation 2901, the electronic device (e.g., the electronic device 101, 201, or 400) may detect motion data (sensor data) through the sensor module (e.g., the sensor module 240 or 460). For example, if a motion recognition service start event occurs, the electronic device may display the physical information 3000 for displaying the amount of exercise on the display 430 as shown in FIG. 30A. At this time, the physical information 3000 may be configured or changed by characters, user's photos, or avatars, and the information showing that the exercise is not performed upon the occurrence of the motion recognition service start event may be graphically (blackly) displayed.

In operation 2903, the electronic device may detect a motion pattern corresponding to the motion data among the motion patterns stored in the memory. For example, if a plurality of motion patterns corresponding to the motion data are detected, the electronic device may select one of the motion patterns based on the user's input information that is detected through the input module 440.

In operation 2905, the electronic device may identify a body part that corresponds to the motion pattern. For example, the electronic device may identify the body part that is in motion through the exercise corresponding to the motion pattern.

In operation 2907, the electronic device may display the amount of exercise of the body part corresponding to the motion pattern. For example, the electronic device may change a graphic variable of the body part 3010 that is in motion through the exercise and may (brightly) display the same as shown in FIG. 30B. Additionally, the electronic device may display, on the display 430, the motion pattern (exercise type) 3020 corresponding to the body part of which the exercise is not detected. In the case where the exercise of all of the body parts is detected (3030) as shown in FIG. 30C, the electronic device may display that the exercise is to be terminated.

According to various embodiments of the present disclosure, if the motion data corresponding to the motion pattern is continuously detected for a predetermined time, the electronic device may display the amount of exercise of the body part corresponding to the motion pattern. Here, the predetermined time may be determined by user's body information (e.g., the amount of body fat, the amount of muscle, etc.) or the user's targeted exercise intensity.

According to various embodiments of the present disclosure, the electronic device may differently display the amount of exercise of the body part corresponding to the motion pattern to correspond to the duration of the motion data corresponding to the motion pattern. For example, the electronic device may change at least one of the color, the brightness, or the transparency of the body part that is displayed on the display 430, and may differently display the amount of exercise of the corresponding body part to correspond to the duration of the motion data.

Figure 31:
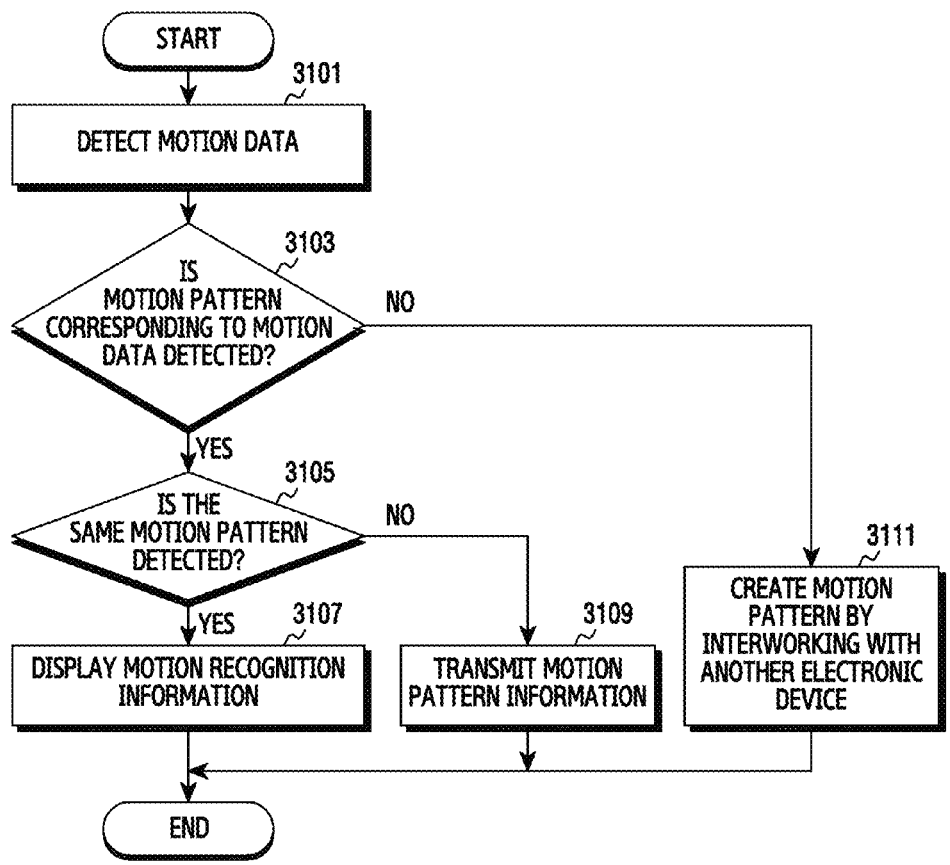
FIG. 31 is a flowchart illustrating operations of the electronic device interworking with a nearby electronic device for motion recognition, according to various embodiments of the present disclosure.

FIG. 31 is a flowchart illustrating operations regarding the electronic device interworking with a nearby electronic device for the motion recognition, according to various embodiments of the present disclosure.

Referring now to FIG. 31, in operation 3101, the electronic device (e.g., the electronic device 101, 201, or 400) may detect motion data (sensor data) through one or more sensors.

In operation 3103, the electronic device may identify whether or not a motion pattern corresponding to the motion data is detected among the motion patterns stored in the memory. For example, the motion recognition module 412 may identify whether or not the motion pattern corresponding to the motion data is detected based on the waveform of the motion data or the features of the motion data.

In operation 3105, if the motion pattern corresponding to the motion data is detected, the electronic device may identify whether or not the same motion pattern as another electronic device that interworks for the motion recognition is detected. For example, the motion recognition module 412 may identify whether or not the same motion pattern as another electronic device is detected at the same time based on the motion pattern information that is provided by another electronic device that interworks for the motion recognition.

If the same motion pattern as another electronic device, which interworks for the motion recognition, is detected, the electronic device may display the motion recognition information on the display (e.g., the display 430) in operation 3107.

If a different motion pattern from another electronic device, which interworks for the motion recognition, is detected, or if the motion pattern is not detected in another electronic device, the electronic device may transmit the information on the motion pattern corresponding to the motion data to another electronic device in operation 3109.

If the motion pattern corresponding to the motion data is not detected, the electronic device may create a motion pattern corresponding to the motion data by interworking with another electronic device in operation 3111. For example, the motion recognition management module 414 may create a new motion pattern corresponding to the motion data as operation 1701 to operation 1709. At this time, the motion recognition management module 414 may configure, as the name of the new motion pattern, the motion pattern name that is received from another electronic device that interworks for the motion recognition.

Figure 32:
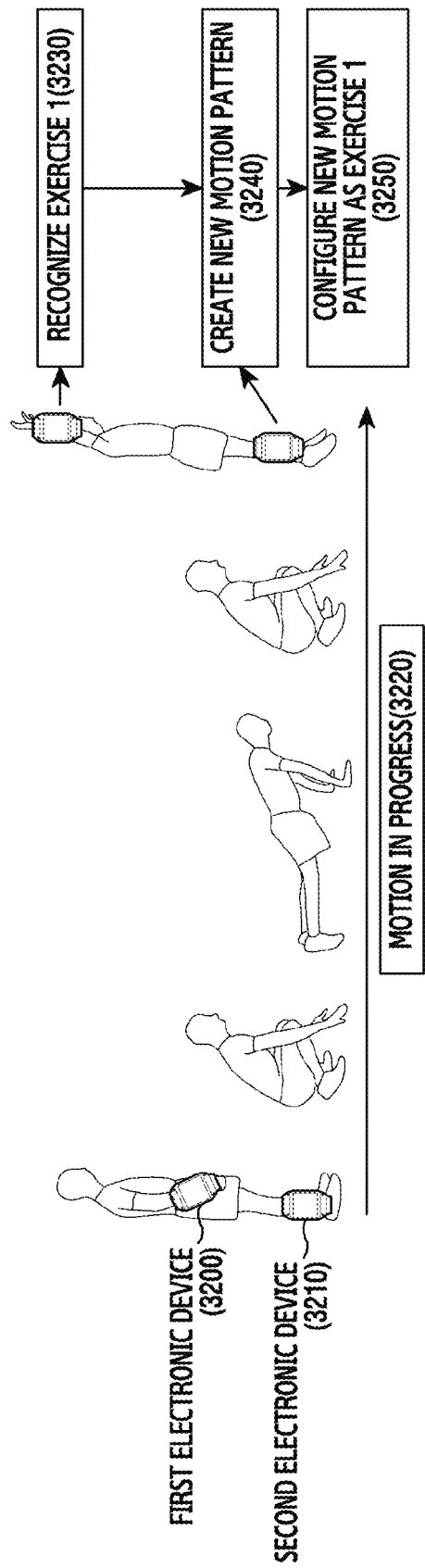
FIG. 32 shows a configuration for creating a motion pattern based on motion recognition information of a nearby electronic device in the electronic device, according to various embodiments of the present disclosure.

FIG. 32 shows a configuration for creating a motion pattern based on motion recognition information of a nearby electronic device in the electronic device, according to various embodiments of the present disclosure.

Referring now to FIG. 32, if the user wears the first electronic device 3200 and the second electronic device 3210 and performs an exercise, the first electronic device 3200 and the second electronic device 3210 may be connected for the interworking of the motion recognition by the two electronic devices.

The first electronic device 3200 and the second electronic device 3210 may detect the motion data through each sensor module in response to the user's motion (motion in progress) 3220.

The first electronic device 3200 may detect a motion pattern (e.g., the motion pattern of Exercise 1) corresponding to the motion data from the memory (3230). Accordingly, the first electronic device 3200 may recognize that the user has performed the motion of Exercise 1.

If the second electronic device 3210 fails to detect the motion pattern corresponding to the motion data from the memory, the second electronic device 3210 may create a new motion pattern based on the features of the motion data (3240). The second electronic device 3210 may configure the name of the new motion pattern to be the same as the name of the motion pattern (e.g., Exercise 1), which is detected in the first electronic device 3200 at the same time (3250).

Figure 33:
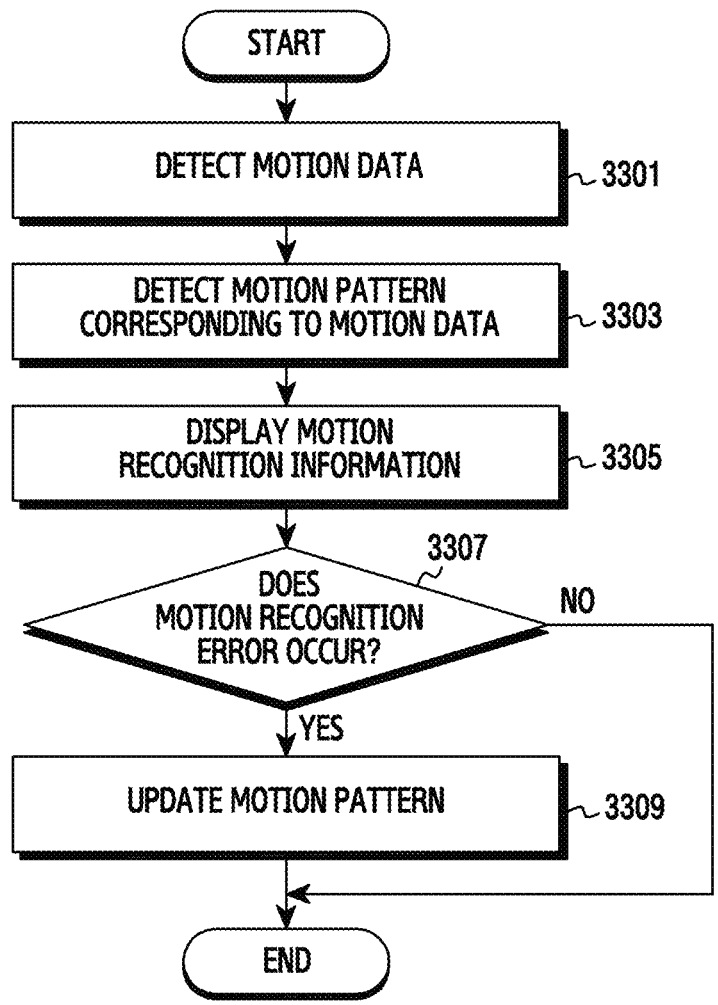
FIG. 33 is a flowchart illustrating operations for updating a motion pattern based on a motion recognition error in the electronic device, according to various embodiments of the present disclosure.

FIG. 33 is a flowchart illustrating operations for updating a motion pattern based on the misrecognition of a motion in the electronic device, according to various embodiments of the present disclosure.

Referring now to FIG. 33, in operation 3301, the electronic device (e.g., the electronic device 101, 201, or 400) may detect motion data (e.g., sensor data) through one or more sensors.

In operation 3303, the electronic device may detect one motion pattern corresponding to the motion data among the motion patterns stored in the memory. For example, the motion recognition module 412 may compare each motion pattern stored in the memory 420 with the waveform of the motion pattern in order to thereby detect the motion pattern corresponding to the motion data.

In operation 3305, the electronic device may display the motion recognition information on the motion pattern corresponding to the motion data. For example, the motion recognition module 412 may display the name of the motion pattern corresponding to the motion data on the display 430.

In operation 3307, the electronic device may identify whether or not an error in the motion recognition occurs. For example, the motion recognition management module 414 may identify whether or not the motion recognition error information is input through the input module 440 in response to the display of the motion recognition information.

In operation 3309, if there is an error in the motion recognition, the electronic device may change the recognition range of the motion pattern. For example, the motion recognition management module 414 may reduce the recognition range of the motion pattern, which is detected in operation 3303, in response to the motion recognition error.

According to various embodiments of the present disclosure, the electronic device may extract the features of the motion data that is detected through the sensor module in order to thereby identify whether or not there is a motion pattern corresponding to the motion data. If the motion pattern corresponding to the motion data is not detected, the electronic device may create a new motion pattern based on the features of the motion data that is extracted to identify the existence of the motion pattern corresponding to the motion data.

According to various embodiments of the present disclosure, the electronic device may include a plurality of motion patterns (e.g., acceleration, a rotational angle, intensity) for a single motion of the user. According to this aspect, the electronic device may recognize the user's motion based on the comparison result between each of the plurality of motion patterns and the motion data. According to an embodiment, if there is a decrease in the motion recognition rate by using one or more motion patterns from among the plurality of motion patterns, the electronic device may increase the motion recognition rate by additionally considering the remaining motion patterns.

According to various embodiments of the present disclosure, the operating method of an electronic device may include: detecting one or more pieces of motion data corresponding to the motion of the electronic device; identifying whether or not there is a motion pattern corresponding to the one or more pieces of motion data in a memory of the electronic device; and creating a motion pattern based on at least some of the one or more pieces of motion data according to whether or not there is the motion pattern corresponding to the one or more pieces of motion data.

According to various embodiments, the creating of the motion pattern may comprise: extracting at least one cycle of a pattern from the pattern contained in the one or more pieces of motion data; and creating the motion pattern based on the features that are contained in the at least one cycle of a pattern.

According to various embodiments, the features contained in the at least one cycle of a pattern may include at least one of an average, dispersion, a cycle, a peak value of a waveform of the motion data, and/or an absolute value, dispersion, distance, and the amount of change of a valley value, and/or distance.

According to various embodiments, the creating of the motion pattern may comprise: identifying whether or not the one or more pieces of motion data contain a repeated pattern; if the one or more pieces of motion data contain the repeated pattern, extracting at least one cycle of a pattern from the repeated pattern contained in the one or more pieces of motion data; and creating the motion pattern based on the features that are contained in the at least one cycle of a pattern.

According to various embodiments, the creating of the motion pattern may comprise creating a new motion pattern based on one or more pieces of sensor data that is detected through a sensor module of the electronic device and one or more pieces of log data corresponding to the one or more pieces of sensor data, which is stored in the memory.

According to various embodiments, the method may further comprise collecting execution information on the motion pattern in response to the existence of the motion pattern corresponding to the one or more pieces of motion data.

According to various embodiments of the present disclosure, the operating method of an electronic device may include: detecting one or more pieces of motion data corresponding to the motion of the electronic device; detecting a motion pattern corresponding to the one or more pieces of motion data; and updating the motion pattern based on at least some of the one or more pieces of motion data.

According to various embodiments, the detecting of the motion pattern may comprise: comparing waveforms of the one or more pieces of motion data with one or more motion patterns that are stored in a memory of the electronic device; and detecting the motion pattern corresponding to the one or more pieces of motion data based on the comparison result.

According to various embodiments, the updating of the motion pattern may comprise updating the recognition range or the pattern structure of the motion pattern based on at least some (a part or portion) of the one or more pieces of motion data.

According to various embodiments, the updating of the motion pattern may comprise reducing the recognition range of the motion pattern in response to a recognition error for the motion pattern.

According to various embodiments, the method may further comprise collecting execution information on the motion pattern.

According to various embodiments, the updating of the motion pattern may comprise updating the motion pattern based on one or more pieces of sensor data that is detected through a sensor module of the electronic device and one or more pieces of log data corresponding to the one or more pieces of sensor data, which is stored in the memory.

According to various embodiments of the present disclosure, the operating method of an electronic device may include: detecting one or more pieces of motion data corresponding to the motion of the electronic device; detecting a motion pattern corresponding to the one or more pieces of motion data; comparing the one or more pieces of motion data with the motion pattern; and displaying information for changing the motion based on at least some (part or portion) of the comparison result.

According to various embodiments, the displaying of the information for changing the motion may comprise displaying the information for changing the motion based on difference between the one or more pieces of motion data and at least one of the trajectory, the speed, the intensity, or the cycle of the motion pattern.

According to various embodiments, the method may further comprise providing the information for changing the motion by using at least one of a display and/or an audio module of the electronic device.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a program module form. The instruction, when executed by at least one processor (e.g., the processor 120), may cause the one or more processors to execute the function corresponding to the instruction. The computer-readable storage medium may be, for example, the memory 130.

The electronic device and the operating method thereof, according to various embodiments, may create or update the motion pattern based on the motion data that is detected through one or more sensors in order to thereby improve the motion recognition performance.

The electronic device and the operating method thereof, according to various embodiments, may provide the exercise guide information or exercise execution information based on the motion data that is detected through one or more sensors in order to thereby increase the utility of the motion recognition service.

The apparatuses and methods of the disclosure can be implemented in hardware, and in part as firmware or via the execution of software or computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as by a at least one processor, so that the methods described herein are loaded into hardware such as a general purpose computer, or a special processor or in programmable or dedicated hardware, such as an ASIC or FPGA. As would be understood in the art, the computer, the processor, microprocessor, controller, control unit or the programmable hardware include memory components, e.g., RAM, ROM, Flash, etc., that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" constitute hardware in the claimed disclosure that contain circuitry that is configured for operation. Under the broadest reasonable interpretation, the appended claims constitute statutory subject matter in compliance with 35 U.S.C. §101 and none of the elements are software per se. No claim element herein is to be construed under the provisions of 35 U.S.C. 112, sixth paragraph, unless the element is expressly recited using the phrase "means for".

The definition of the terms "unit" or "module" as referred to herein are to be understood as constituting hardware circuitry such as a CCD, CMOS, SoC, AISC, FPGA, at least one processor or microprocessor (e.g. a controller or control unit) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. §101 and do not constitute software per se. For example, the image processor in the present disclosure, and any references to an input unit and/or an output unit both comprise hardware circuitry configured for operation.

The computer readable recoding medium may include a hard disk, a floppy disk, magnetic media (for example, a magnetic tape), optical media (for example, a Compact Disc Read Only Memory (CD-ROM) and a Digital Versatile Disc (DVD)), magneto-optical media (for example, a floptical disk), a hardware device (for example, a Read Only Memory (ROM), a Random Access Memory (RAM), a flash memory), and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

The embodiments disclosed herein are provided to explain technical details of the present disclosure and to help the understanding of the present disclosure, and are not intended to limit the scope of various embodiments of the present disclosure. Therefore, it should be construed that all modifications and changes or various other embodiments based on the technical idea of various embodiments of the present disclosure fall within the scope of various embodiments of the present disclosure.

What is claimed is:

1. An electronic device comprising:
    at least one sensor;
    at least one processor electrically connected to the at least one sensor; and
    a memory connected to the at least one processor,
    wherein the memory stores instructions, which when executed, cause the at least one processor to:
        detect sensor data corresponding to a motion of the electronic device, via the at least one sensor;
        determine whether a motion pattern corresponding to the detected sensor data is detected in the memory;
        extract at least one cycle of a pattern from a repeated pattern contained in the detected sensor data in response to the motion pattern corresponding to the detected sensor data not being detected in the memory; and
        create a motion pattern based on one or more attributes that are contained in the at least one cycle of a pattern.

2. The electronic device of claim 1, wherein the attributes contained in the at least one cycle of a pattern include at least one of an average, dispersion, a cycle, a peak value of a waveform of the sensor data, and/or an absolute value, dispersion, distance, and an amount of change of a valley value, and/or distance.

3. The electronic device of claim 1, wherein the instructions, when executed, cause the at least one processor to create a new motion pattern based on the detected sensor data and one or more pieces of log data stored in the memory corresponding to the sensor data.

4. The electronic device of claim 1, wherein the instructions, when executed, cause the at least one processor to collect execution information on the motion pattern in response to identifying an existence of the motion pattern corresponding to the detected sensor data.

5. An electronic device comprising:
    at least one sensor;
    at least one processor electrically connected to the at least one sensor; and
    a memory connected to the at least one processor,
    wherein the memory stores instructions, which when executed, cause the at least one processor to:
        detect sensor data corresponding to a motion of the electronic device, via the at least one sensor,
        identify a motion pattern corresponding to the detected sensor data, and
        update the motion pattern based on at least a portion of the detected sensor data.

6. The electronic device of claim 5, wherein the instructions, when executed, cause the at least one processor to compare waveforms of the detected sensor data with one or more motion patterns that are stored in the memory; and detect the motion pattern corresponding to the detected sensor data based on a comparison result.

7. The electronic device of claim 5, wherein the instructions, when executed, cause the at least one processor to update a recognition range or a pattern structure of the motion pattern based on at least a portion of the detected sensor data.

8. The electronic device of claim 5, wherein the instructions, when executed, cause the at least one processor to reduce a recognition range of the motion pattern in response to a recognition error for the motion pattern.

9. The electronic device of claim 5, wherein the instructions, when executed, cause the at least one processor to collect execution information on the motion pattern.

10. The electronic device of claim 5, wherein the instructions, when executed, cause the at least one processor to update the motion pattern based on the detected sensor data and one or more pieces of log data stored in memory corresponding to the detected sensor data.

11. An operating method of an electronic device, the method comprising:
   detecting motion data corresponding to a motion of the electronic device;
   determining whether a motion pattern corresponding to the detected motion data is detected in a memory of the electronic device;
   extracting at least one cycle of a pattern from a repeated pattern contained in the detected motion data in response to the motion pattern corresponding to the detected motion data not being detected in the memory; and
   creating a motion pattern based on one or more attributes that are contained in the at least one cycle of a pattern.

12. The method of claim 11, wherein the one or more attributes contained in the at least one cycle of a pattern includes at least one of an average, dispersion, a cycle, a peak value of a waveform of the motion data, and/or an absolute value, dispersion, distance, and an amount of change of a valley value, and/or distance.

13. The method of claim 11, wherein the creating of the motion pattern comprises creating a new motion pattern based on sensor data that is detected through a sensor of the electronic device and one or more pieces of log data stored in the memory corresponding to the sensor data.

14. The method of claim 11, further comprising collecting execution information on the motion pattern in response to identifying that the motion pattern corresponds to the detected motion data.

15. The method of claim 11, further comprising:
   identifying a motion pattern corresponding to the detected motion data; and
   updating the motion pattern based on at least a plurality of the detected motion data.

16. The method of claim 11, further comprising:
   identifying a motion pattern corresponding to the detected motion data;
   comparing the detected motion data with the motion pattern; and
   displaying information for changing the motion based on at least a portion of a comparison result.

* * * * *